US011304216B2

(12) United States Patent
Gupta et al.

(10) Patent No.: US 11,304,216 B2
(45) Date of Patent: *Apr. 12, 2022

(54) SIGNALING MECHANISMS FOR SUB-BAND SCHEDULING IN SIDELINK

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,862

(22) Filed: May 31, 2019

(65) Prior Publication Data
US 2019/0289617 A1 Sep. 19, 2019

Related U.S. Application Data

(63) Continuation of application No. 15/442,298, filed on Feb. 24, 2017, now Pat. No. 10,477,566.
(Continued)

(51) Int. Cl.
*H04W 72/12* (2009.01)
*H04L 5/00* (2006.01)
(Continued)

(52) U.S. Cl.
CPC ....... *H04W 72/1247* (2013.01); *H04L 5/0041* (2013.01); *H04W 72/0453* (2013.01);
(Continued)

(58) Field of Classification Search
CPC ............ H04W 72/1247; H04W 72/06; H04W 76/14; H04W 72/0453; H04W 72/10; H04L 5/0041
(Continued)

(56) References Cited

U.S. PATENT DOCUMENTS

| 2007/0081485 A1 | 4/2007 | Li et al. |
| 2011/0228666 A1* | 9/2011 | Barbieri ................ H04W 76/14 370/216 |

(Continued)

OTHER PUBLICATIONS

MTC frequency and time resource usage in a cell 3GPP TSG RAN WG1 Meeting #80bis Belgrade, Serbia, Apr. 20-24, 2015 (Year: 2015).*

(Continued)

*Primary Examiner* — Michael Y Mapa
(74) *Attorney, Agent, or Firm* — Loza & Loza, LLP

(57) ABSTRACT

A device may use sidelink request and sidelink response (e.g., DSS/STS and DRS) resources (in a sub-band) of different sizes depending on whether the sub-band is a primary sub-band or secondary sub-band. The device may transmit more information in the request/response resources of a primary sub-band than in the request/response resources of a secondary sub-band. The device may transmit small amounts of information in its request/response resources in secondary sub-bands. The resources in the secondary sub-bands may include, for example, reference signals, and signals indicating occupation of the sub-band. The device may utilize tone signaling for request/response signaling in the secondary sub-bands (at least because the amount of information being conveyed in the secondary sub-bands is small) and digital signaling in the primary sub-band (at least because the amount of information being conveyed in the primary sub-band is large in comparison to that being conveyed in the secondary sub-bands).

28 Claims, 18 Drawing Sheets

Related U.S. Application Data

(60) Provisional application No. 62/374,480, filed on Aug. 12, 2016, provisional application No. 62/373,303, filed on Aug. 10, 2016.

(51) Int. Cl.

| | | |
|---|---|---|
| *H04W 72/04* | (2009.01) | |
| *H04W 72/06* | (2009.01) | |
| *H04W 76/14* | (2018.01) | |
| *H04W 72/10* | (2009.01) | |

(52) U.S. Cl.
CPC ........... *H04W 72/06* (2013.01); *H04W 76/14* (2018.02); *H04W 72/10* (2013.01)

(58) Field of Classification Search
USPC ...................................... 455/41.2, 450–452.1
See application file for complete search history.

(56) References Cited

U.S. PATENT DOCUMENTS

| | | | |
|---|---|---|---|
| 2017/0353932 A1* | 12/2017 | Sorrentino | H04W 52/383 |
| 2018/0049219 A1 | 2/2018 | Gupta et al. | |
| 2019/0021081 A1* | 1/2019 | Ljung | H04W 72/0406 |

OTHER PUBLICATIONS

Ericsson: "Contents of PSCCH for V2V over PC5", 3GPP Draft; R1-165264, 3rd Generation Partnership Project (3GPP), Mobile Competence Centre ; 650, Route Des Lucioles ; F-06921 Sophia-Antipolis Cedex ; France, vol. RAN WG1, No. Nanjing; May 14, 2016, XP051089796, Retrieved from the Internet: URL:http://www.3gpp.org/ftp/tsg_ran/WG1_RL1/TSGR1_85/Docs/ [retrieved on May 14, 2016], 4 pages.

Ericsson: "Sensing and Autonomous Resource Selection", 3GPP Draft; R1-165266, 3rd Generation Partnership Project (3GPP), Mobile Competence Centre; 650, Route Des Lucioles; F-06921 Sophia-Antipolis Cedex; France, vol. RAN WG1, No. Nanjing; May 14, 2016, XP051089795, Retrieved from the Internet: URL:http://www.3gpp.org/ftp/tsg_ran/WG1_RL1/TSGR1_85/Docs [retrieved on May 14, 2016], 7 pages.

Ericsson: "Subbands and Measurements for Sensing for V2V Over PC5", 3GPP Draft; R1-165273, 3rd Generation Partnership Project (3GPP), Mobile Competence Centre; 650, Route Des-Lucioles; F-06921 Sophia-Antipolis Cedex; France, vol. RAN WG1, No. Nanjing; May 14, 2016, XP051089791, Retrieved from the Internet: URL:http://www.3gpp.org/ftp/tsg_ran/WG1_RL1/TSGR1_85/Docs/ [retrieved on May 14, 2016], 3 pages.

International Search Report and Written Opinion—PCT/US2017/044985—ISA/EPO—dated Oct. 20, 2017.

Panasonic: "MTC Frequency and Time Resource Usage in a Cell", 3GPP Draft; Draft_R1-151659, 3rd Generation Partnership Project (3GPP), Mobile Competence Centre; 650, Route Des-Lucioles; F-06921 Sophia-Antipolis Cedex; France, vol. RAN WG1, No. Belgrade, Serbia; Apr. 19, 2015, XP050934081, Retrieved from the Internet: URL:http://www.3gpp.org/ftp/Meetings_3GPP SYNC/RAN1/Docs/, 3 pages.

Samsung: "Scheduling Assignment Options for V2V Communication", 3GPP Draft; R1-160576, 3rd Generation Partnership Project (3GPP), Mobile Competence Centre; 650, Route Des-Lucioles; F-06921 Sophia-Antipolis Cedex; France, vol. RAN WG1, No. St Julian's, Malta; Feb. 6, 2016, XP051064229, Retrieved from the Internet: U RL:http://www.3gpp.org/ftp/tsg_ran/WG1_RL1/TSGR1_84/Docs/ [retrieved on Feb. 6, 2016], 5 pages.

Panasonic: "MIB/PBCH for eMTC", 3GPP TSG RAN WG1 Meeting #82bis, 3GPP Draft; R1-155759, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015 (Oct. 4, 2015), 4 Pages, XP051039739, Retrieved from the Internet URL: http://www.3gpp.org/ftp/Meetings_3GPP_SYNC/RAN1/Docs/ [retrieved on Oct. 4, 2015].

\* cited by examiner

SIGNALING MECHANISMS FOR SUB-BAND SCHEDULING IN SIDELINK

PRIORITY CLAIM

This application is a continuation of and claims the benefit of nonprovisional patent application Ser. No. 15/442,298, filed in the United States Patent and Trademark Office on Feb. 24, 2017, claims priority to and the benefit of provisional patent application No. 62/374,480, filed in the United States Patent and Trademark Office on Aug. 12, 2016, and provisional patent application No. 62/373,303, filed in the United States Patent and Trademark Office on Aug. 10, 2016, the entire content of each is incorporated herein by reference as if fully set forth below in its entirety and for all applicable purposes.

TECHNICAL FIELD

The technology discussed herein relates generally to wireless communication systems, and more particularly, to control signaling mechanisms for sub-band scheduling in sidelink communications.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

A user equipment (UE) may sometimes communicate directly with another UE without relaying such communication through a network access node, such as an evolved Node B (eNB) or an access point (AP). An example of such UE-to-UE (a.k.a., device-to-device) communication may be referred to herein as sidelink communication. With sidelink communication, a UE communicates in a cellular system, generally under the control of a base station. However, the UE is further configured to communicate directly with another UE without relaying such communication through the network access node.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of wireless communication. The method may include determining, for a given sidelink, a primary sub-band and a plurality of secondary sub-bands from among a plurality of sub-bands designated for sidelink communication, determining, for the given sidelink, an assignment of resources in the primary sub-band and in each of the plurality of secondary sub-bands, a size of the assignment of resources being dependent on whether a given sub-band is the primary sub-band or one of the plurality of secondary sub-bands, and transmitting, for the given sidelink, control signaling utilizing the assigned resources on the primary sub-band and on each of the plurality of secondary sub-bands.

In other aspects, the present disclosure provides an apparatus for wireless communication, comprising a processor, a transceiver communicatively coupled to the processor, and a memory communicatively coupled to the processor. According to some implementations, the processor is configured to determine, for a given sidelink, a primary sub-band and a plurality of secondary sub-bands from among a plurality of sub-bands designated for sidelink communication. The processor is further configured to determine, for the given sidelink, an assignment of resources in the primary sub-band and in each of the plurality of secondary sub-bands, a size of the assignment of resources being dependent on whether a given sub-band is the primary sub-band or one of the plurality of secondary sub-bands. The processor is further configured to transmit, for the given sidelink, control signaling utilizing the assigned resources on the primary sub-band and on each of the plurality of secondary sub-bands.

In still another aspect, the disclosure provides an apparatus for wireless communication, comprising means for determining, for a given sidelink, a primary sub-band and a plurality of secondary sub-bands from among a plurality of sub-bands designated for sidelink communication, means for determining, for the given sidelink, an assignment of resources in the primary sub-band and in each of the plurality of secondary sub-bands, a size of the assignment of resources being dependent on whether a given sub-band is the primary sub-band or one of the plurality of secondary sub-bands, and means for transmitting, for the given sidelink, control signaling utilizing the assigned resources on the primary sub-band and on each of the plurality of secondary sub-bands.

In yet another aspect, the disclosure provides a non-transitory computer-readable medium storing processor-executable code, comprising code for causing a processor to determine, for a given sidelink, a primary sub-band and a plurality of secondary sub-bands from among a plurality of sub-bands designated for sidelink communication, determine, for the given sidelink, an assignment of resources in the primary sub-band and in each of the plurality of secondary sub-bands, a size of the assignment of resources being dependent on whether a given sub-band is the primary sub-band or one of the plurality of secondary sub-bands, and transmit, for the given sidelink, control signaling utilizing the assigned resources on the primary sub-band and on each of the plurality of secondary sub-bands.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

According to some aspects, a device uses a sidelink request signal (e.g., direction selection signal (DSS)/service transmit signal (STS)) or sidelink response signal (e.g., destination receive signal (DRS)) resources (in a sub-band) of different sizes depending on whether the sub-band is a primary sub-band or secondary sub-band. The device may transmit more information in the DSS/STS/DRS resources of a primary sub-band than in the DSS/STS/DRS resources of a secondary sub-band. The resources may include, for example, source/destination identification, transmission duration, reference signals, a channel quality indicator (CQI), and a modulation and coding scheme (MCS). The device may transmit small amounts of information in its DSS/STS/DRS resources in secondary sub-bands. The resources may include, for example, reference signals, and signals indicating occupation of the sub-band. The device may utilize tone signaling for DSS/STS/DRS in the secondary sub-bands (at least because the amount of information being conveyed in the secondary sub-bands is small) and digital signaling in the primary sub-band (at least because the amount of information being conveyed in the primary sub-band is large in comparison to that being conveyed in the secondary sub-bands).

Operational Environment

Figure 1:
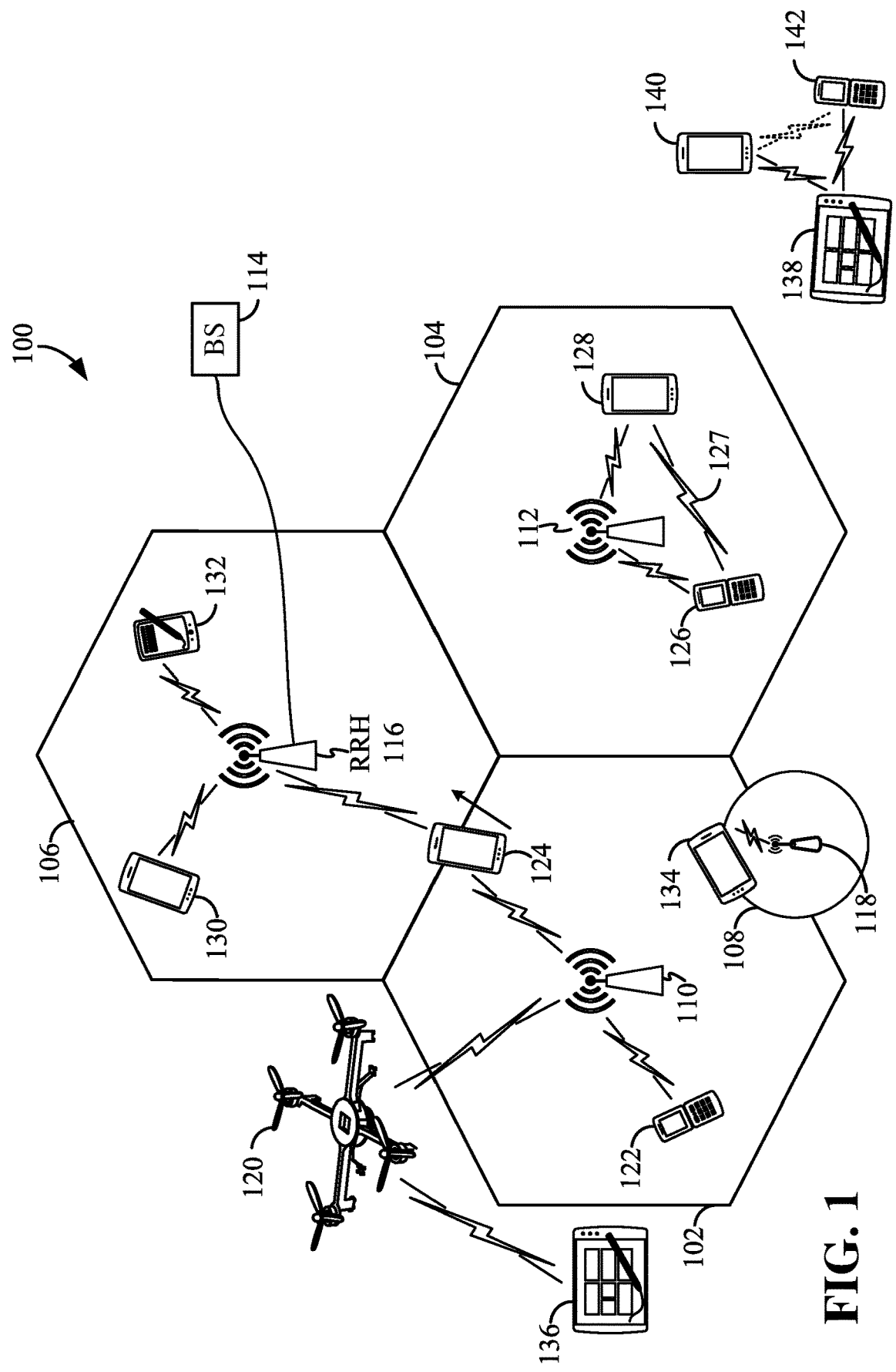
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone, which may be configured to function as a mobile base station 120. That is, in some examples, a cell may not necessarily be stationary, and the geographic area of the cell may move according to the location of a mobile base station 120, such as the quadcopter or drone.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter, drone, mobile base station 120) may be configured to function as a UE. For example, the mobile base station 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be time-divided into transmission time intervals (TTIs), frames, subframes, slots, and/or symbols. As used herein, a symbol may refer to a unit of time that, in an OFDM waveform, carries one resource element (RE) per subcarrier. A slot or subframe may carry a set of OFDM symbols (where different slots or subframes may in some examples include different numbers of OFDM symbols), and may have any suitable duration (e.g., 250 μs, 500 μs, 1 ms, etc.). Multiple slots or subframes may be grouped together to form a single frame or radio frame. As used herein, the term TTI may refer to an inter-arrival time of a given schedulable set of data. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can transmit information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, the term "signaling" may mean "control signaling" and a "signal" may be a "control signal." Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity, UE 138.

Figure 2:
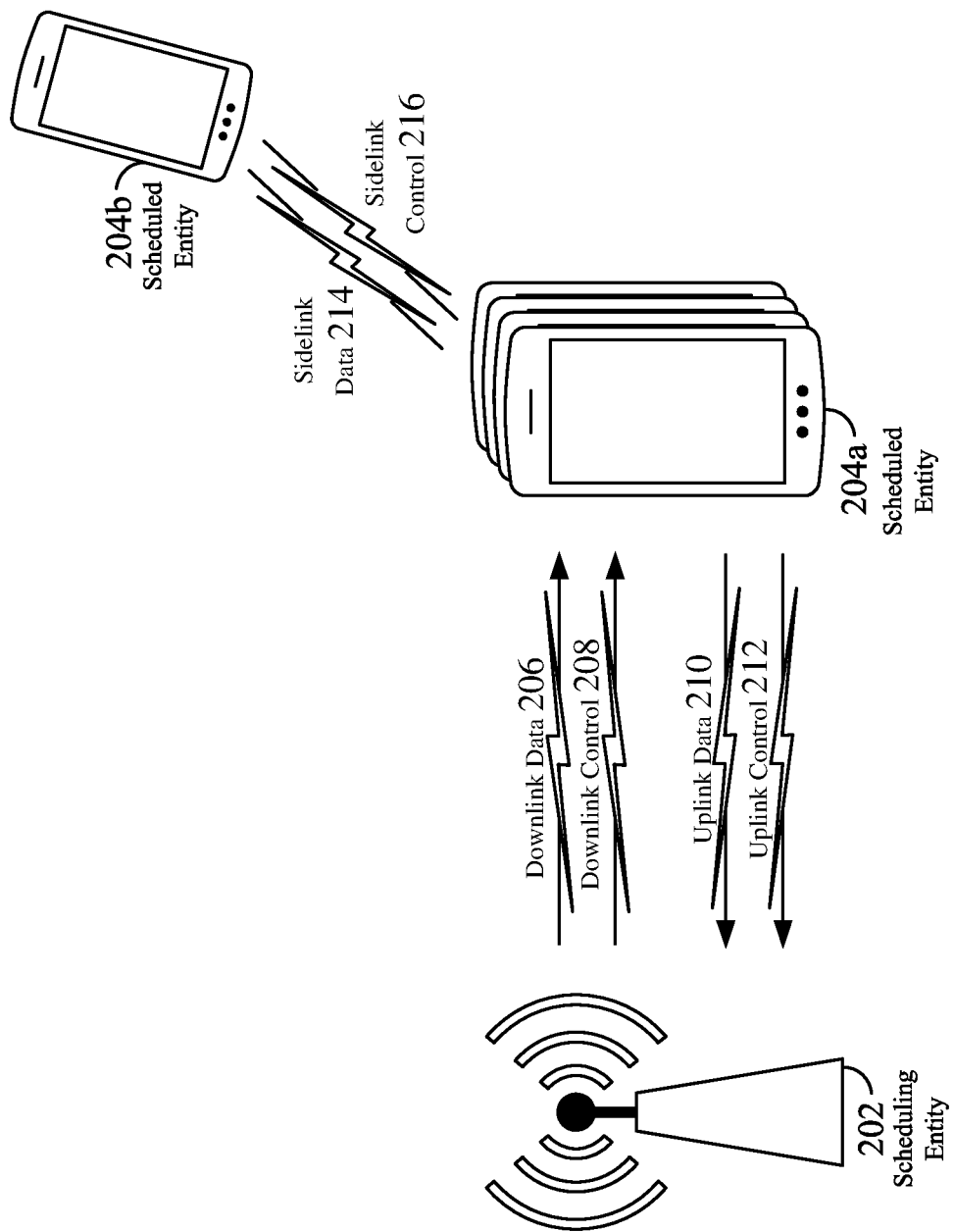
FIG. 2 is a diagram conceptually illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). As used herein, reference to a scheduled entity 204 may be understood to be reference to one or more of scheduled entity 204a and/or scheduled entity 204b. Here, the scheduling entity 202 may correspond to a base station 110, 112, 114, and/or 118. In additional examples, the scheduling entity 202 may correspond to a UE 138, the quadcopter (e.g., mobile base station 120), or any other suitable node in the access network 100. Similarly, in various examples, any one of the plurality of scheduled entities 204 may correspond to the UE 122, 124, 126, 128, 130, 132, 134, 136, 138, 140, and 142, or any other suitable node in the access network 100.

As illustrated in FIG. 2, the scheduling entity 202 may broadcast data to one or more scheduled entities 204 (the data may be referred to as downlink data 206). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204 (e.g., 204a or 204b). Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast downlink control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204 (e.g., 204a, 204b). The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may transmit a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may additionally be transmitted between the scheduling entity 202 and the one or more scheduled entities 204 (e.g., 204a, 204b).

Furthermore, the scheduled entities 204 (e.g., 204a, 204b) may transmit uplink control information 212 including one or more uplink control channels to the scheduling entity 202. Uplink control information 212 may include a variety of packet types and categories, including pilots, reference signals, and information configured to enable or assist in decoding uplink data transmissions. In some examples, the uplink control information 212 may include a scheduling request (SR), i.e., request for the scheduling entity 202 to schedule uplink transmissions. Here, in response to the SR transmitted on the control channel, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 (e.g., 204a, 204b) may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 (i.e., sidelink traffic) and sidelink control information 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 (e.g., 204a, 204b) to request a duration of time to keep a sidelink channel available for a sidelink signal; and the DRS may provide for the scheduled entity 204 to indicate the availability of the sidelink channel, e.g., for a requested duration of time. An exchange of DSS/STS and DRS signals (e.g., handshake) may enable different scheduled entities (e.g., 204a, 204b) performing sidelink communications to negotiate the availability of the sidelink channel prior to communication of the sidelink data 214 information. The PSHICH may include HARQ acknowledgment information and/or a HARQ indicator from a destination device, so that the destination may acknowledge data received from a source device.

The channels or carriers illustrated in FIG. 2 are not necessarily all of the channels or carriers that may be utilized between a scheduling entity 202 and scheduled entities 204 (e.g., 204a, 204b), and those of ordinary skill in the art will recognize that other channels or carriers may be utilized in addition to those illustrated, such as other data, control, and feedback channels.

Scheduling Entity

Figure 3:
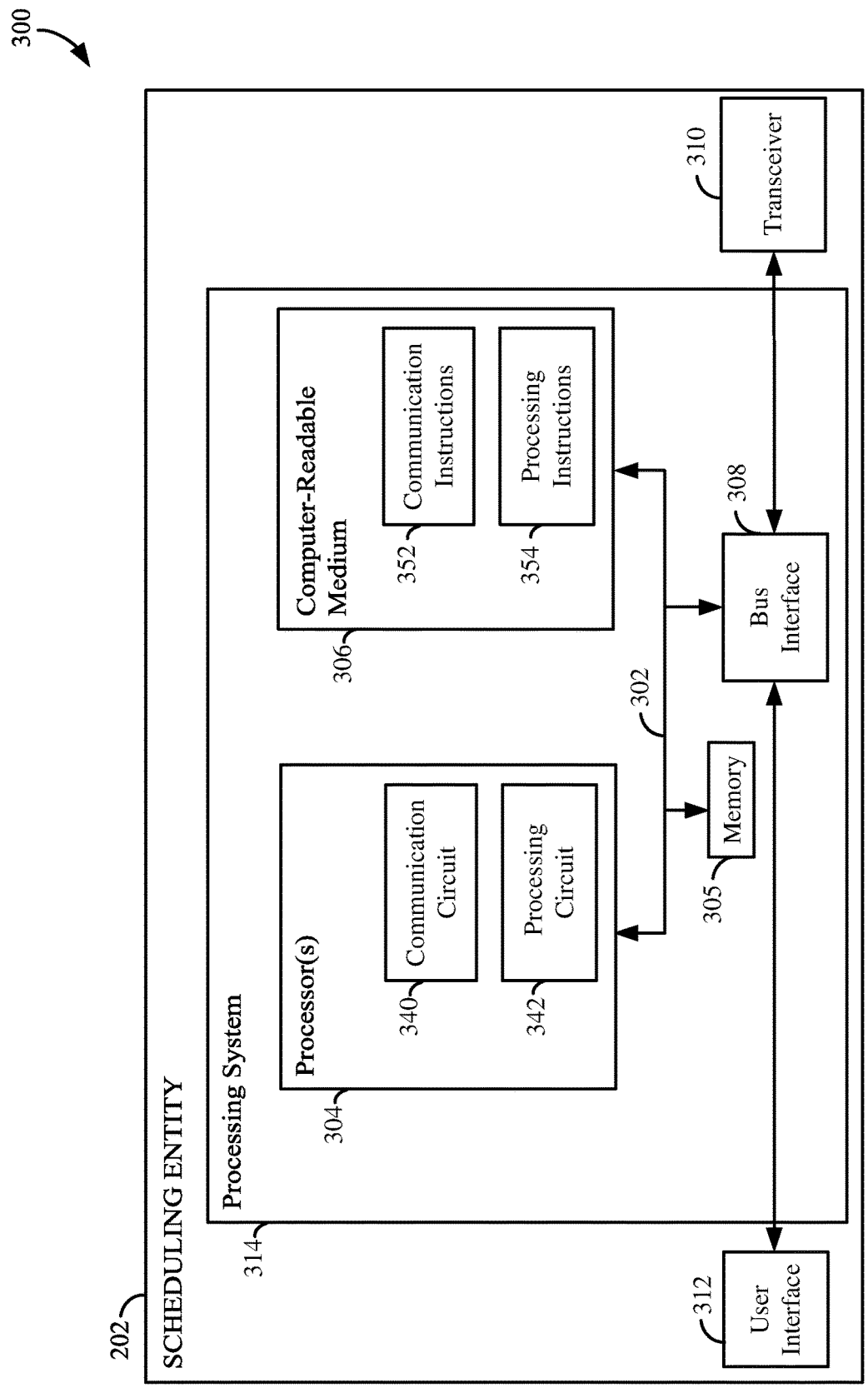
FIG. 3 is a diagram illustrating an example of a hardware implementation for a scheduling entity according to some aspects of the present disclosure.

FIG. 3 is a diagram 300 illustrating an example of a hardware implementation for a scheduling entity 202 according to some aspects of the present disclosure. The scheduling entity 202 may employ a processing system 314. For example, the scheduling entity 202 may be a user equipment (UE) as illustrated in any one or more of FIGS. 1, 2, and/or 12. In another example, the scheduling entity 202 may be a base station as illustrated in FIG. 1.

The scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used or configured to implement any one or more of the processes described herein, for example, in FIGS. 14-18.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a communication interface or a means for communicating with various other apparatuses over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. For example, the communication instructions 352 may include code for configuring the processing system 314 and transceiver 310 (e.g., communication interface) to communicate and control a plurality of scheduled entities using sidelink communication. In some aspects of the disclosure, the computer-readable medium 306 may include processing instructions 354. The processing instructions 354 may include instructions for performing various operations related to signal processing (e.g., processing a received signal and/or processing a signal for transmission) as described herein. In one example, the processing instructions 354 include code that may be executed by the processor 304 to control and schedule sidelink communication as described in FIGS. 14-18.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer.

The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. For example, the communication circuit 340 may be configured to control and schedule sidelink communication among a plurality of scheduled entities. The communication circuit 340 may transmit or broadcast sidelink grants or control information to the scheduled entities using a downlink control channel (e.g., PDCCH) via the transceiver 310 (e.g., communication interface). In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Scheduled Entity

Figure 4:
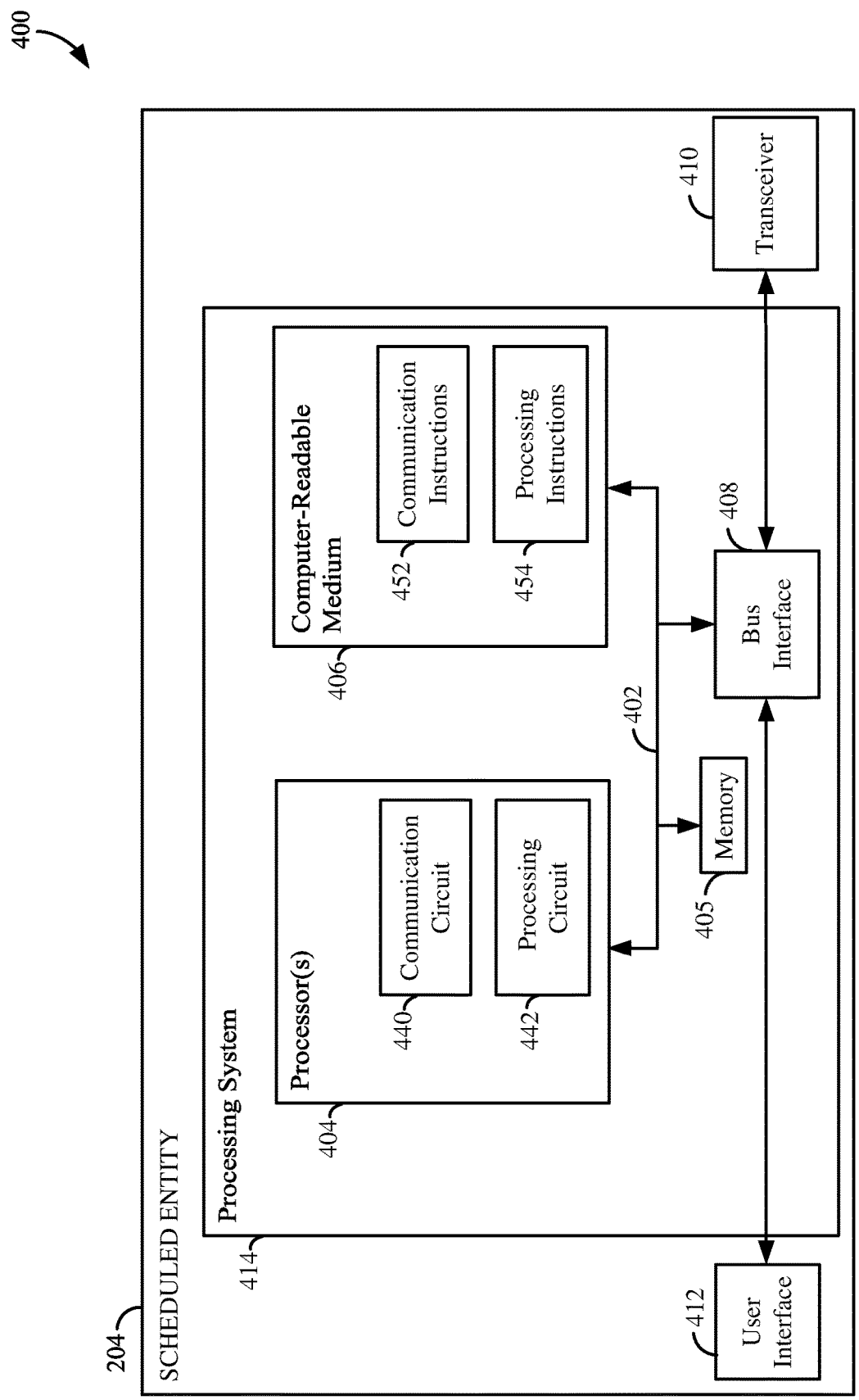
FIG. 4 is a diagram illustrating an example of a hardware implementation for a scheduled entity according to some aspects of the present disclosure.

FIG. 4 is a diagram 400 illustrating an example of a hardware implementation for a scheduled entity 204 (e.g., 204a or 204b) according to some aspects of the present disclosure. The scheduled entity 204 may employ a processing system 414. The scheduled entity 204 may be implemented with a processing system 414 that includes one or more processors 404. For example, the scheduled entity 204 may be a user equipment (UE) as illustrated in any one or more of FIGS. 1, 2, 4, 11, 12, and/or 13.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used or configured to implement any one or more of the processes described herein, for example, in FIGS. 9-12.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or a means for communicating with various other apparatuses over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the communication instructions 452 may include code for configuring the scheduled entity to perform sidelink communication as described in relation to FIGS. 14-18. In some aspects of the disclosure, the computer-readable medium 406 may include processing instructions 454. The processing instructions 454 may include instructions for performing various operations related to signal processing (e.g., processing a received signal and/or processing a signal for transmission) as described herein. In some aspects of the disclosure, the processing instructions 454 may include code for configuring the scheduled entity to perform sidelink communication as described in relation to FIGS. 14-18.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. For example, the communication circuit 440 may be configured to perform sidelink communication as described in relation to FIGS. 7-18. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. For example, the processing circuit 442 may be configured to perform sidelink communication as described in relation to FIGS. 14-18.

The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Subframe Structure

Below are provided descriptions of exemplary channels (e.g., allocations of time and frequency) that can be allocated to a TTI, in terms of exemplary content of various subframes, including a downlink-centric (DL-centric) subframe, an uplink-centric (UL-centric) subframe, and a sidelink-centric subframe. According to various aspects of the disclosure, wireless communication may be implemented by dividing transmissions, in time, into frames, wherein each frame may be further divided into subframes. These subframes may be DL-centric, UL-centric, or sidelink-centric, as described below.

Figure 5:
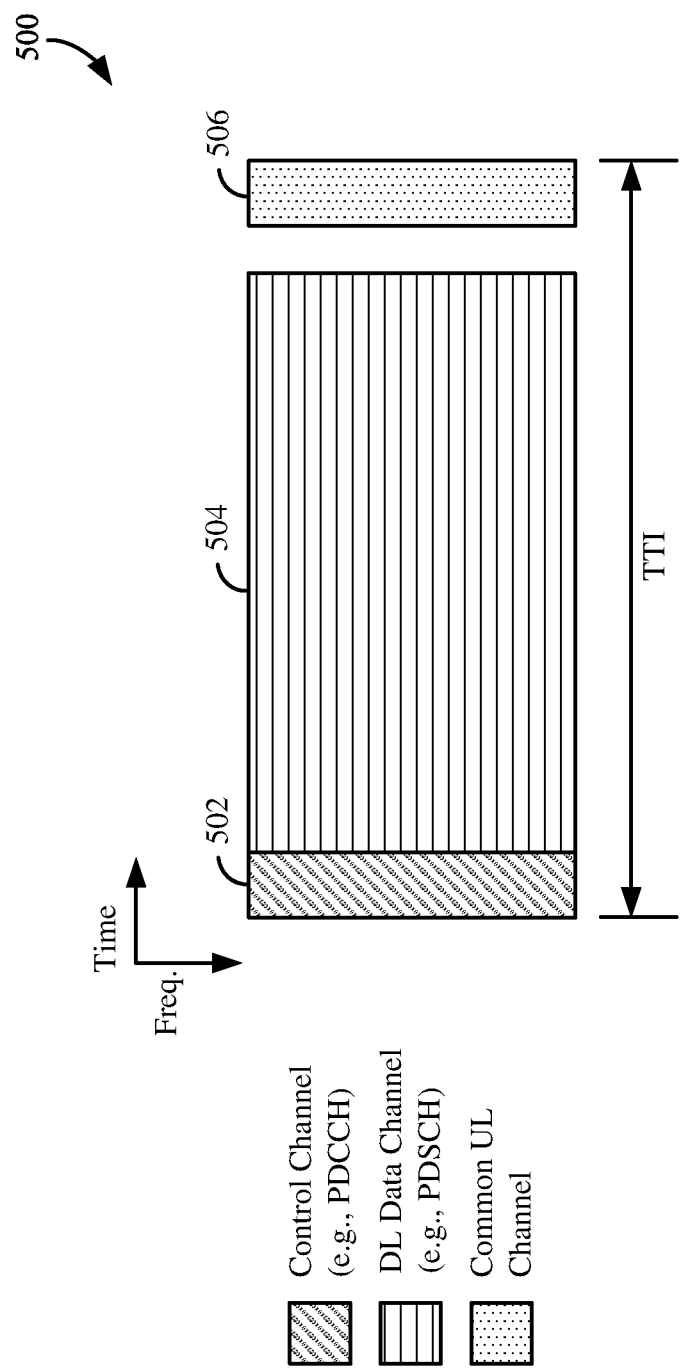
FIG. 5 is a diagram illustrating an example of a downlink (DL)-centric subframe according to some aspects of the present disclosure.

FIG. 5 is a diagram 500 illustrating an example of a DL-centric subframe (or slot) according to some aspects of the present disclosure. The DL-centric subframe may be referred to as a DL-centric subframe because a majority (or, in some examples, a substantial portion) of the subframe includes DL data. The DL-centric subframe may include a control channel 502. The control channel 502 may exist in the initial or beginning portion of the DL-centric subframe. The control channel 502 may include various scheduling information and/or control information corresponding to various channels of the DL-centric subframe. In some configurations, the control channel 502 may be a physical DL control channel (PDCCH), as indicated in FIG. 5. Additional description related to the PDCCH is provided further below with reference to various other figures. The DL-centric subframe may also include a DL data channel 504. The data included in the DL data channel 504 may sometimes be referred to as the payload of the DL-centric subframe. The DL data channel 504 may include the communication resources utilized to communicate DL data from the scheduling entity 202 (e.g., eNB) to the scheduled entity 204 (e.g., UE, 204a, 204b). In some configurations, the DL data channel 504 may be a physical DL shared channel (PDSCH).

The DL-centric subframe may also include a common UL channel 506. The common UL channel 506 may sometimes be referred to as an UL burst, a common UL burst, a common UL burst channel, and/or various other suitable terms. The common UL channel 506 may include feedback information corresponding to various other channels of the DL-centric subframe. For example, the common UL channel 506 may include feedback information corresponding to the control channel 502. Non-limiting examples of feedback information may include an ACK signal, a NACK signal, a HARQ indicator, and/or various other suitable types of information. The common UL channel 506 may include additional or alternative information, such as information pertaining to random access channel (RACH) procedures, scheduling requests (SRs), and various other suitable types of information. As illustrated in FIG. 5, the end of the DL data channel 504 may be separated in time from the beginning of the common UL channel 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
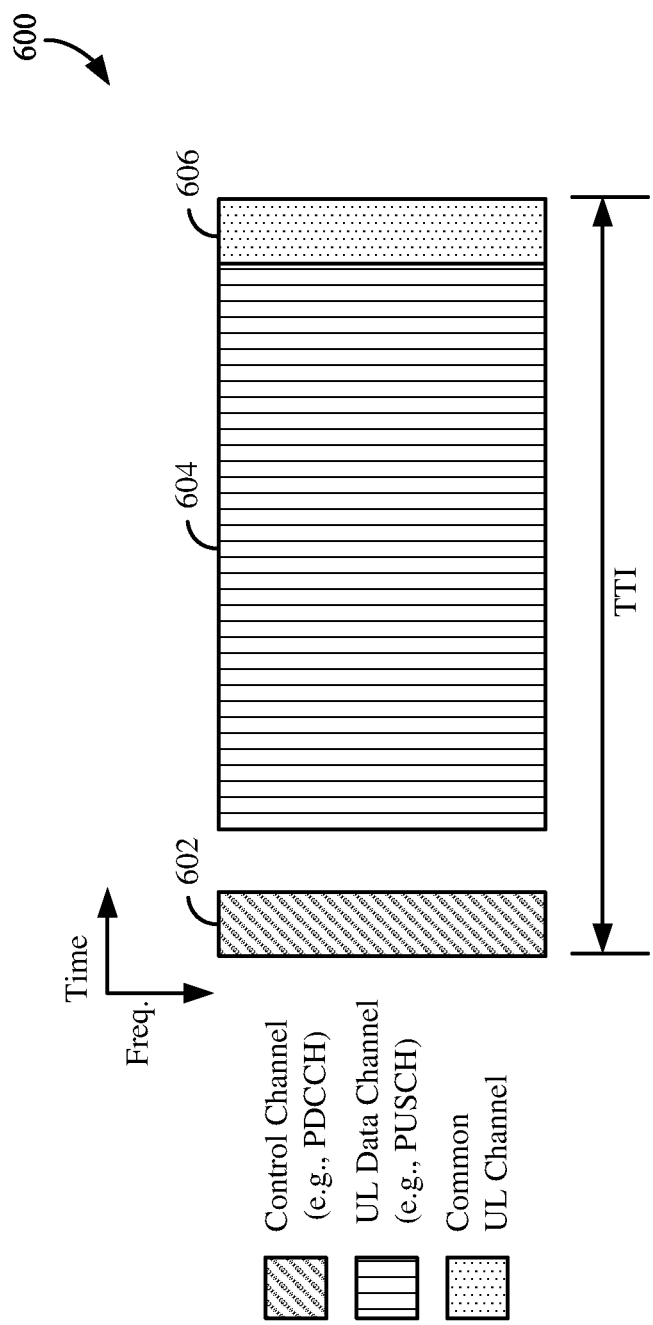
FIG. 6 is a diagram illustrating an example of an uplink (UL)-centric subframe according to some aspects of the present disclosure.

FIG. 6 is a diagram 600 illustrating an example of an UL-centric subframe (or slot) according to some aspects of the present disclosure. The UL-centric subframe may be referred to as a UL-centric subframe because a majority (or, in some examples, a substantial portion) of the subframe includes UL data. The UL-centric subframe may include a control channel 602. The control channel 602 may exist in the initial or beginning portion of the UL-centric subframe. The control channel 602 in FIG. 6 may be similar to the control channel 502 described above with reference to FIG. 5. The control channel 602 may be a PDCCH. The UL-centric subframe may also include an UL data channel 604. The data included in the UL data channel 604 may sometimes be referred to as the payload of the UL-centric subframe. The UL portion may include the communication resources utilized to communicate UL data from the scheduled entity 204 (e.g., UE, 204a, 204b) to the scheduling entity 202 (e.g., eNB). In some configurations, the UL data channel 604 may be a physical UL shared channel (PUSCH). As illustrated in FIG. 6, the end of the control channel 602 may be separated in time from the beginning of the UL data channel 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL channel 606. The common UL channel 606 in FIG. 6 may be similar to the common UL channel 506 described above with reference to FIG. 5. The common UL channel 606 may include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Sidelink

In some circumstances, two or more scheduled entities 204 (e.g., UEs, 204a, 204b) may communicate with each other using sidelink signals. Real-world applications of such sidelink communications may include public safety, proximity services, eMBB mesh, UE-to-network relaying, vehicle-to-vehicle (V2V) communications, Internet of Everything (IoE) communications, IoE mesh, Internet of Things (IoT) communications, mission-critical mesh (MiCr mesh), device to device (D2D), and/or various other suitable applications. Generally, a sidelink signal may refer to a signal communicated from one scheduled entity 204a (e.g., UE1) to another scheduled entity 204b (e.g., UE2) without relaying that signal through the scheduling entity 202 (e.g., eNB), even though the scheduling entity 202 (e.g., eNB) may be utilized for scheduling and/or control purposes. In some examples, sidelink signals may be communicated using a licensed spectrum (unlike wireless local area networks, which typically use an unlicensed spectrum).

Figure 7:
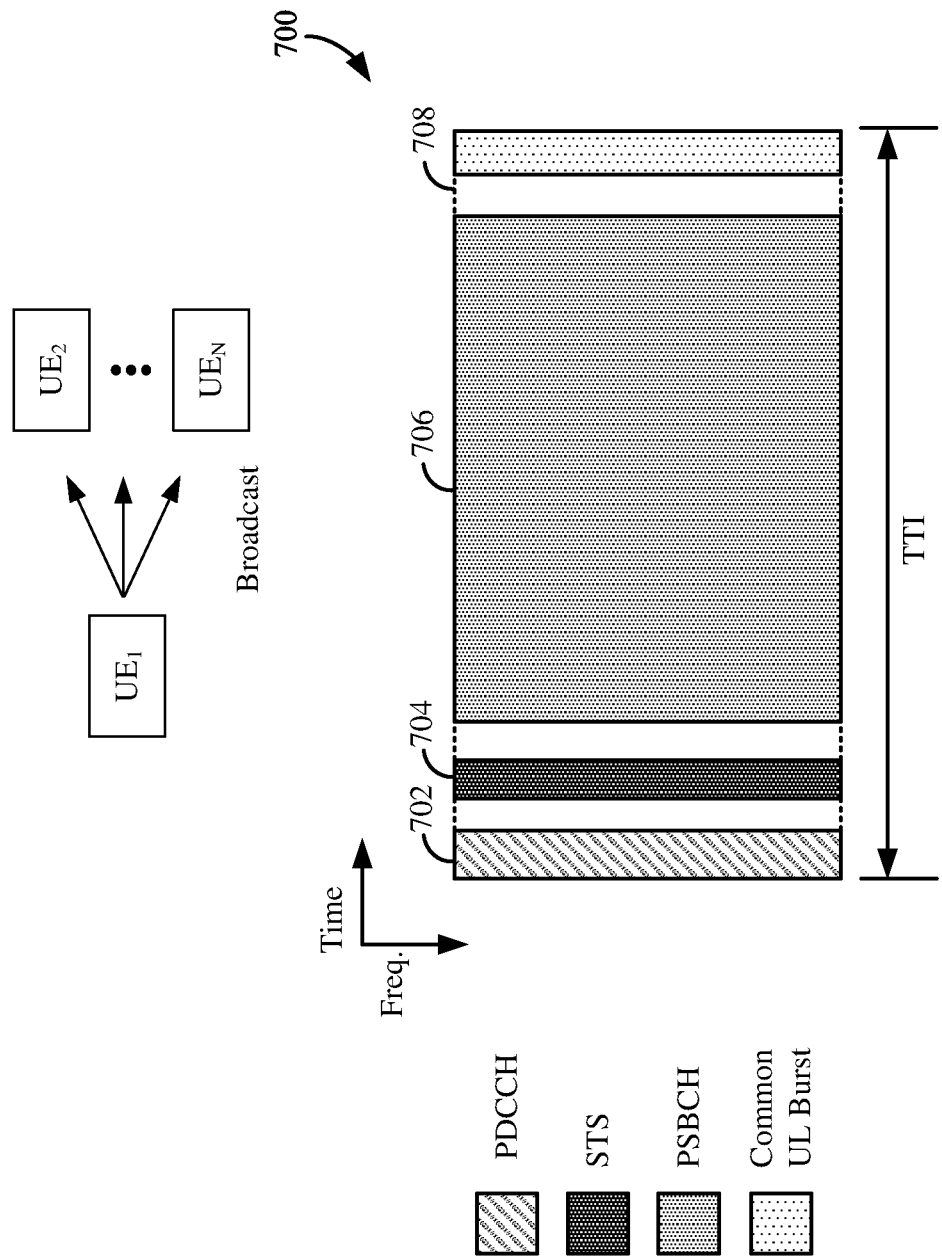
FIG. 7 is a diagram illustrating an example of a sidelink-centric subframe according to some aspects of the present disclosure.
Figure 8:
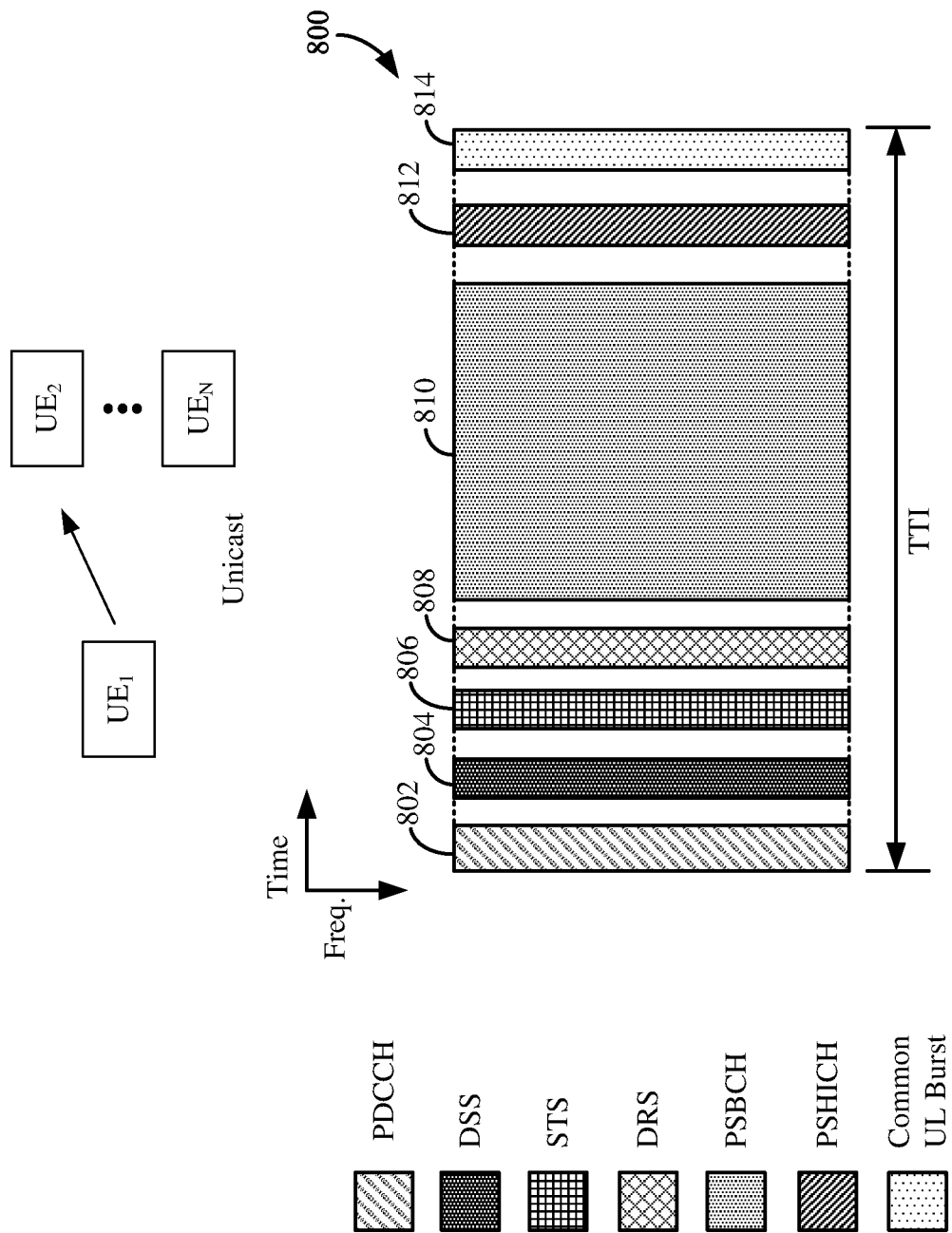
FIG. 8 is a diagram illustrating another example of a sidelink-centric subframe according to some aspects of the present disclosure.

In general, two types of sidelink-centric subframes (or slots) may be realized: a sidelink-centric subframe that may be realized for broadcast communication (exemplified by FIG. 7) and a sidelink-centric subframe may be realized for unicast communication (exemplified by FIG. 8). In a broadcast situation (e.g., a point-to-multipoint communication), a sidelink transmitter may transmit a source transmit signal (STS) to a plurality of sidelink receivers, but may not obtain channel quality information, or even a DRS, from the plurality of sidelink receivers before the sidelink transmitter transmits (e.g., broadcasts, sends) sidelink data to the plurality of sidelink receivers. In a unicast situation (e.g., a point-to-point communication), a sidelink transmitter may transmit a direction selection signal (DSS) and/or a source transmit signal (STS) (formerly referred to as, or similar to, an RTS), to one sidelink receiver, and may receive channel quality information from the one sidelink receiver before the sidelink transmitter broadcasts sidelink data to the one sidelink receiver. Although the features described herein may be described in the context of unicast sidelink-centric subframes, nothing herein is intended to limit the scope of the disclosure to such a context. Accordingly, for completeness of the disclosure, descriptions of exemplary broadcast and unicast sidelink-centric subframes are provided herein.

Broadcast Sidelink Subframe

FIG. 7 is a diagram 700 illustrating an example of a sidelink-centric subframe (or slot) according to some aspects of the present disclosure. The sidelink-centric subframe may be referred to as a sidelink-centric subframe because a majority (or, in some examples, a substantial portion) of the subframe includes sidelink data. In some configurations, this sidelink-centric subframe may be utilized for broadcast communication. A broadcast communication may refer to a point-to-multipoint transmission by one scheduled entity 204a (e.g., UE1) to a set of one or more of scheduled entities 204b (e.g., UE2-UEN). In this example, the sidelink-centric subframe includes a control channel 702, which may be a PDCCH. In some aspects, the control channel 702 may be similar to the control channel 502 (e.g., PDCCH) described in greater detail above with reference to FIG. 5. Additionally or alternatively, the control channel 702 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs, 204a, 204b). In comparison, generic grant information may refer to information that generally enables sidelink communications to occur within a particular cell, without specifying a particular sidelink communication. It is noted that the control channel 702 may use frequency division multiplexing (FDM) to multiplex control channel information (e.g., data, indicators, parameters, etc.) regarding one or more sidelinks and one or more nominal uplinks (e.g., an uplink from a UE to an eNB) or other nominal signals (e.g., non-sidelink signals) within a single TTI, frame, subframe, or predetermined period.

As illustrated in FIG. 7, the control channel 702 may be included in the beginning or initial portion of the sidelink-centric subframe. By including the control channel 702 in the beginning or initial portion of the sidelink-centric subframe, the likelihood of interfering with the control channels 502, 602 of DL-centric and UL-centric subframes of nominal traffic is minimized. In other words, because the DL-centric subframe, the UL-centric subframe, and the sidelink-centric subframe have their DL control information communicated during a common portion of their respective subframes, the likelihood of interference between the DL control information and the sidelink signals is minimized.

The sidelink-centric subframe may also include a source transmit signal (STS) 704 channel (formerly referred to as, or similar to a, request-to-send (RTS) channel). The STS 704 channel may refer to a portion of the subframe during which a scheduled entity 204a (e.g., UE1, a UE utilizing a sidelink signal), communicates a request signal (i.e., an STS signal) indicating, for example, a requested duration of time to keep a sidelink channel available for a sidelink signal. One of ordinary skill in the art will understand that the STS signal may include additional or alternative various information without necessarily deviating from the scope of the present disclosure. In some configurations, the STS signal may include a group destination identifier (ID). The group destination ID may correspond to a group of devices) that are intended to receive the STS signal. In some configurations, the STS signal may, for example, indicate a duration of the sidelink transmission. In some configurations, the STS signal may, for example, include a reference signal (RS) to enable channel estimation and receiver-yielding (RX-yielding), a modulation and coding scheme (MCS) indicator, and/or various other information.

The sidelink-centric subframe may also include a sidelink data channel 706. The data included in the sidelink data channel 706 may sometimes be referred to as the payload, sidelink-burst, or sidelink regular burst of the sidelink-centric subframe. In some aspects, a sidelink regular burst may include an MCS chosen based on DRS CQI feedback. The sidelink data channel 706 may include the communication resources utilized to communicate sidelink data from one scheduled entity 204a (e.g., UE1) to one or more other scheduled entities 204b (e.g., UE2-UEN). In an example where the sidelink-centric subframe is utilized for broadcast communications, the sidelink data channel 706 may carry a physical sidelink broadcast channel (PSBCH) (formerly a physical sidelink shared channel (PSSCH)), as indicated in FIG. 7. The sidelink data channel 706 may include the communication resources utilized to communicate sidelink data from one scheduled entity 204a (e.g., $UE_1$) to one or more other scheduled entities 204b (e.g., $UE_2$-$UE_N$).

According to a further aspect of the disclosure, a broadcast sidelink-centric subframe may take on certain characteristics based on whether or not the broadcast is separated from other sidelink devices that utilize unicast sidelink-centric subframes as described above. Here, a broadcast sidelink-centric subframe utilized in the absence of unicast sidelink-centric subframe transmissions may be referred to as an orthogonalized broadcast, while a broadcast sidelink-centric subframe utilized in the presence of unicast sidelink-centric subframe transmissions may be referred to as an in-band broadcast.

The sidelink data channel 706 may be configured utilizing a suitable MCS selected according to channel conditions. In one example, the receiving device may select an MCS based on a measurement of a receive power of a reference signal in the STS 704 channel (or portion), and a measurement of interference. For example, in low receive power and/or high interference scenarios, the receiving device may select a more robust MCS, e.g., utilizing a lower modulation order and/or a lower coding rate.

The sidelink-centric subframe may also include a common UL channel 708. In some aspects, the common UL channel 708 may be similar to the common UL channel 506, 606 described above with reference to FIGS. 5-6. Notably, as illustrated in FIG. 7, the common UL channel 708 may be included in the end portion of the sidelink-centric subframe. By including the common UL channel 708 in the end portion of the sidelink-centric subframe, the likelihood of interfering with the common UL channel 506, 606 of DL-centric and UL-centric subframes of nominal traffic is minimized or reduced. In other words, because the DL-centric subframe, the UL-centric subframe, and the sidelink-centric subframe have their common UL channel 506, 606, 708 communicated during a similar portion of their respective subframe, the likelihood of interference between those common UL channels 506, 606, 708 is minimized or reduced.

Unicast Sidelink Subframe

FIG. 8 is a diagram 800 illustrating another example of a sidelink-centric subframe (or slot) according to some aspects of the present disclosure. In some configurations, this sidelink-centric subframe may be utilized for a unicast communication. A unicast sidelink or unicast communication may refer to a point-to-point transmission between two devices, such as between a first scheduled entity 204a (e.g., first device, UE1, UE 126) and a particular second scheduled entity 204b (e.g., second device, UE2, UE 128). For purposes of handshaking, one device may be defined (e.g., designated) as a primary device, while the other device may be defined as a secondary device. The primary device may have priority for sidelink access. During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., base station). The relay device may experience relatively less path loss (when communicating with the scheduling entity 202 (e.g., base station)) relative to the path loss experienced by the non-relay device.

A sidelink-centric subframe for unicast may include a control channel 802 (e.g., a physical downlink control channel (PDCCH)), a direction selection signal (DSS) 804 a source transmit signal (STS) 806, a destination receive signal (DRS) 808, a sidelink data channel 810 (e.g., physical sidelink broadcast channel (PSBCH)), a physical sidelink HARQ indicator channel (PSHICH) 812, and a common uplink channel 814. Description corresponding to aspects of the control channel 802, sidelink data channel 810, and common uplink channel 814 are provided above with reference to FIG. 7 and therefore will not be repeated to avoid redundancy.

In various examples, the content of the DSS and the STS may take different formats. As one example, the DSS 804 may be utilized for direction selection and the STS 806 may be utilized as a request signal. Here, direction selection refers to the selection whether a primary sidelink device transmits a request signal in the STS, or whether a primary sidelink device receives a request signal (i.e., a non-primary or secondary sidelink device transmits a request signal in the STS). In this example, the DSS may include a destination ID (e.g., corresponding to a non-primary or secondary sidelink device) and a direction indication. In this manner, a listening sidelink device that receives the DSS transmission and is not the device corresponding to the destination ID need not necessarily be active and monitoring for the STS transmission. In this example, the STS may include a request signal: e.g., an indication of a requested duration of time to reserve a sidelink channel for sidelink data. Accordingly, with the DSS/STS portions of the sidelink-centric subframe, a request for reservation of the sidelink channel in a desired direction between a primary and a non-primary sidelink device may be established.

In another example, content of the DSS 804 and the STS 806 may be substantially similar to one another, although the DSS 804 may be utilized by a primary sidelink device and the STS 806 may be utilized by a secondary sidelink device. The DSS and/or STS may be utilized by a scheduled entity 204 (e.g., UE) as a request signal to indicate a requested duration of time to keep a sidelink channel available for a sidelink signal. A primary device may transmit a primary request signal (e.g., a DSS) during a primary request portion of a subframe (e.g., DSS portion 804), and a non-primary device (e.g., a secondary device) may transmit a secondary request signal (e.g., an STS) during a secondary request portion of the subframe (e.g., STS portion 806).

One of ordinary skill in the art will understand that the request signal carried on the DSS and/or STS may include various additional or alternative information without necessarily deviating from the scope of the present disclosure. In some configurations corresponding to unicast communication, the DSS and/or STS may include a destination identifier (ID). The destination ID may correspond to a specific apparatus intended to receive the DSS/STS (e.g., $UE_2$). In some configurations, the DSS and/or STS may indicate a duration of the sidelink transmission, and/or may include a reference signal to enable channel estimation and RX-yielding, a modulation and coding scheme (MCS) indicator, and/or various other information. Here, the MCS indicator may be utilized to inform the receiving device of the MCS utilized for transmissions in the data portion 806.

Referring once again to the example wherein the DSS may carry a primary request signal and the STS may carry a secondary request signal, during the DSS 804 portion, the primary device transmits a DSS, and the non-primary device listens for the DSS from a primary device. On the one hand, if the non-primary device detects a DSS during the DSS portion 804, then the non-primary device will not transmit an STS during STS 806. On the other hand, if the non-primary device does not detect a DSS during the DSS 804 portion, then the non-primary device may transmit an STS during the STS 806 portion. A time gap (e.g., guard interval, etc.) between DSS 804 and STS 806 may allow the non-primary device to transition from a listening/receiving state (during DSS 804) to a transmitting state (during STS 806).

If the sidelink channel is available for the requested duration of time, an apparatus identified or addressed by the destination ID in the DSS/STS, which receives the DSS/STS, may communicate a destination receive signal (DRS) during the DRS portion 808. The DRS may indicate availability of the sidelink channel for the requested duration of time. The DRS may additionally or alternatively include other information, such as a source ID, a duration of the transmission, a signal to interference plus noise ratio (SINR) (e.g., of the received RS from the source device), an RS to enable TX-yielding, CQI information, and/or various other suitable types of information.

The exchange of DSS/STS and DRS enable the scheduled entities 204 (e.g., UEs) performing the sidelink communications to negotiate the availability of the sidelink channel prior to the communication of the sidelink signal, thereby minimizing the likelihood of interfering sidelink signals. In other words, without the DSS/STS and DRS, two or more scheduled entities 204 (e.g., UEs) might concurrently transmit sidelink signals using the same resources of the sidelink data portion 810, thereby causing a collision and resulting in avoidable retransmissions.

As described above, the sidelink data may be communicated in the sidelink data channel 810 of the sidelink-centric subframe. In some configurations, the MCS of the sidelink signal communicated in the sidelink data channel 810 may be selected based on CQI information included in the DRS signal obtained in the DRS 808 channel prior to transmitting the data in the sidelink data channel 810.

After communicating the sidelink data in the sidelink data channel 810, acknowledgement information may be communicated between the scheduled entities 204 (e.g., UEs, 204*a*, 204*b*). Such acknowledgement information may be communicated in the PSHICH 812 (also referred to as the sidelink acknowledgement channel) of the sidelink-centric subframe. Non-limiting examples of such acknowledgement information may include an ACK signal, a NACK signal, a HARQ indicator, and/or various other suitable types of acknowledgement information. For example, after receiving and successfully decoding sidelink data from $UE_1$ in the sidelink data channel 810, $UE_2$ may transmit an ACK signal to the $UE_1$ in the PSHICH 812 of the sidelink-centric subframe.

Multi-TTI Sidelink Transmissions

Figure 9:
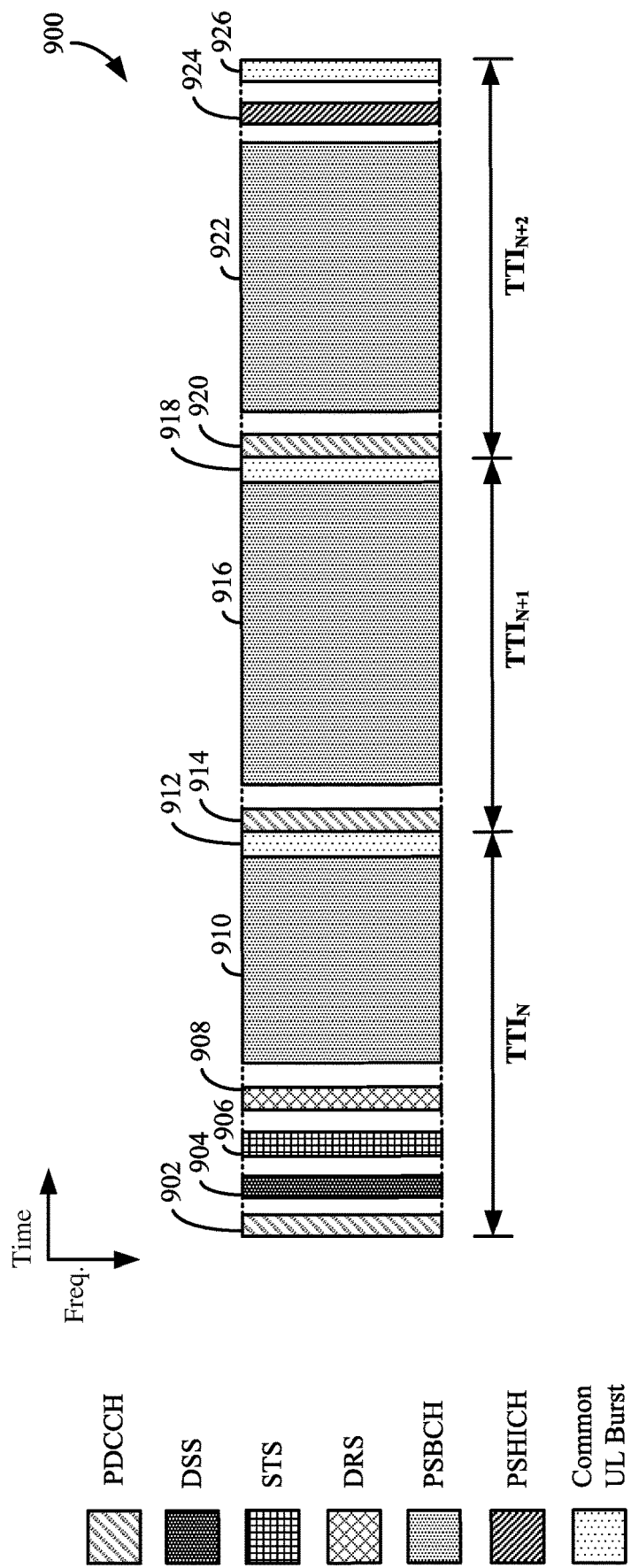
FIG. 9 is a diagram illustrating an example of a plurality of sidelink-centric subframes extending across a plurality of transmission time intervals (TTIs) according to some aspects of the present disclosure.

FIG. 9 is a diagram 900 illustrating an example of a plurality of sidelink-centric subframes extending across a plurality of TTIs according to some aspects of the present disclosure. As appreciated by those skilled in the art, as shown in FIG. 9 (and FIG. 10), sidelink-centric subframes may be provided for muli-TTI support. In some configurations, these sidelink-centric subframes may be utilized for unicast communications. Although the example illustrated in FIG. 9 shows three TTIs (e.g., $TTI_N$, $TTI_{N+1}$, $TTI_{N+2}$), one of ordinary skill in the art will understand that any plural number of TTIs may be implemented without deviating from the scope of the present disclosure. The first TTI (e.g., $TTI_N$) may include the control channel 902 (e.g., PDCCH, as described in greater detail above), DSS 904, STS 906, and DRS 908 channels (as also described in greater detail above).

The DSS/STS signal communicated during DSS 904 and/or STS 906 may indicate a duration that extends across the plurality of TTIs (e.g., $TTI_N$, $TTI_{N+1}$, $TTI_{N+2}$). In other words, the DSS/STS signal may indicate a requested duration of time to keep the sidelink channel available for sidelink signals, and that requested duration extends until the end of the last TTI (e.g., $TTI_{N+2}$) of the plurality of TTIs (e.g., $TTI_N$, $TTI_{N+1}$, $TTI_{N+2}$). If the sidelink channel is available for that requested duration of time, then the DRS signal may be communicated in the DRS 908 channel (as described in greater detail above). Although the plurality of TTIs (e.g., $TTI_N$, $TTI_{N+1}$, $TTI_{N+2}$) each include a sidelink data channel 910, 916, 922, not every TTI requires DSS 904 and/or STS 906. By not including DSS 904 and/or STS 906 in every TTI of the plurality of TTIs (e.g., $TTI_N$, $TTI_{N+1}$, $TTI_{N+2}$), the overall amount of overhead is relatively lower than it would be otherwise (e.g., if DSS 904 and/or STS 906 was/were included in every TTI). By reducing overhead, relatively more of the TTIs (e.g., $TTI_{N+1}$, $TTI_{N+2}$) lacking DSS 904 and/or STS 906 can be utilized for communication of the sidelink data, which thereby increases relative throughput.

DSS 904 and STS 906 may be followed by a sidelink data channel 910 (which is described in greater detail above with reference to the sidelink data channel 706 in FIG. 7). The sidelink data channels 910, 916, 922 may each be followed by a common UL channel 912, 918, 926 (which are described in greater detail above with reference to the common UL channel 708 in FIG. 7). In the example illustrated in FIG. 9, every TTI (e.g., $TTI_{N+1}$, $TTI_{N+2}$) following the first (e.g., $TTI_N$) includes a control channel 914, 920 at an initial/beginning portion of each subframe/TTI and a common UL channel 918, 926 at the end portion of each subframe/TTI. By providing the control channel 914, 920 at the initial/beginning of each subframe/TTI and providing the common UL channel 918, 926 at the end portion of each subframe/TTI, the sidelink-centric subframes have a structure that minimizes the likelihood of interference with DL/UL control/scheduling information of nominal traffic.

In the example illustrated in FIG. 9, the sidelink-centric subframes include one sidelink acknowledgement channel 924 in a last/final TTI (e.g., $TTI_{N+2}$) of the plurality of TTIs (e.g., $TTI_N$, $TTI_{N+1}$, $TTI_{N+2}$). The acknowledgement information communicated in the sidelink acknowledgement channel 924 in the last/final TTI (e.g., $TTI_{N+2}$) may correspond to the sidelink signals included in one or more preceding sidelink data channels 910, 916, 922. For example, the sidelink acknowledgement channel 924 may include a HARQ identifier corresponding to sidelink signals communicated throughout of the sidelink data channels 910, 916, 922 of the plurality of TTIs (e.g., $TTI_N$, $TTI_{N+1}$, $TTI_{N+2}$). Because the sidelink acknowledgment channel 924 is not included in every TTI (e.g., $TTI_N$, $TTI_{N+1}$), the overall amount of overhead is relatively lower than it would otherwise (e.g., if sidelink acknowledgement channel 924 were included in every TTI). By reducing overhead, relatively more of the TTIs (e.g., $TTI_N$, $TTI_{N+1}$) lacking the sidelink acknowledgement channel 924 can be utilized for communication of sidelink data, which thereby increases relative throughput. However, one of ordinary skill in the art will readily understand that the example illustrated in FIG. 9 is non-limiting and alternative configurations may exist without necessarily deviating from the scope of the present disclosure.

Figure 10:
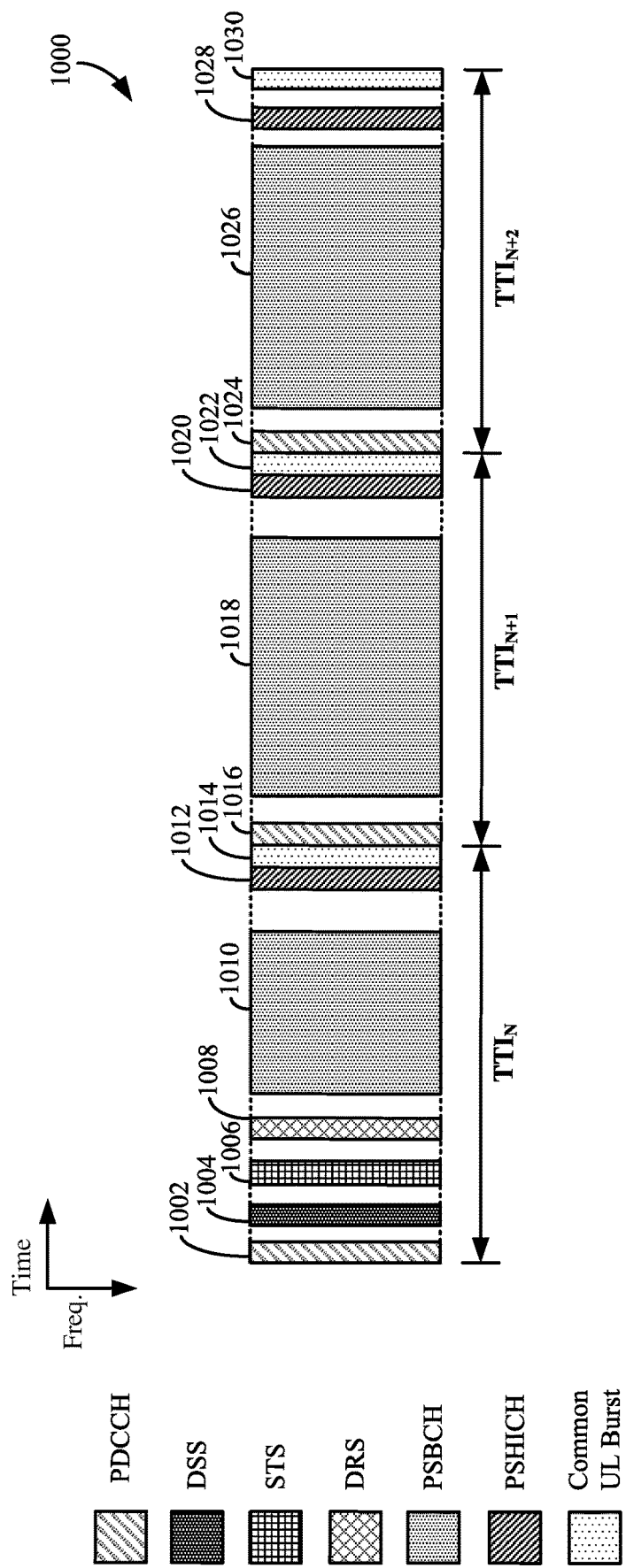
FIG. 10 is a diagram illustrating an example of an alternative configuration of a plurality of sidelink-centric subframes extending across a plurality of TTIs according to some aspects of the present disclosure

FIG. 10 is a diagram 1000 illustrating an example of such an alternative configuration. In other words, FIG. 10 is a diagram illustrating an example of an alternative configuration of a plurality of sidelink-centric subframes extending across a plurality of TTIs according to some aspects of the present disclosure.

Various aspects illustrated in FIG. 10 (e.g., control channels 1002, 1016, 1024; DSS 1004; STS 1006; DRS 1008; and common UL channels 1014, 1022, 1030) are described above with reference to FIG. 9 and therefore will not be repeated here to avoid redundancy. An aspect in which the example illustrated in FIG. 10 may differ from the example illustrated in FIG. 9 is that the example in FIG. 10 includes a sidelink acknowledgement channel 1012, 1020, 1028 in every TTI of the plurality of TTIs (e.g., $TTI_N$, $TTI_{N+1}$, $TTI_{N+2}$). For example, each sidelink acknowledgement channel 1012, 1020, 1028 may respectively communicate acknowledgement information corresponding to a sidelink signal included in the sidelink data channel 1010, 1018, 1026 in its TTI. By receiving acknowledgement information corresponding to the sidelink signal in that particular TTI, the scheduled entity 204 (e.g., UE, 204a, 204b) may obtain relatively better specificity regarding the communication success of each sidelink signal. For example, if only one sidelink signal in a single sidelink data channel (e.g., sidelink data channel 1010) is not successfully communicated, retransmission can be limited to only the affected sidelink channel (e.g., sidelink data channel 1010) without the burden of retransmitting unaffected sidelink channels (e.g., other sidelink data channels 1018, 1026).

Receiver-Yielding and Transmitter Yielding

Figure 11:
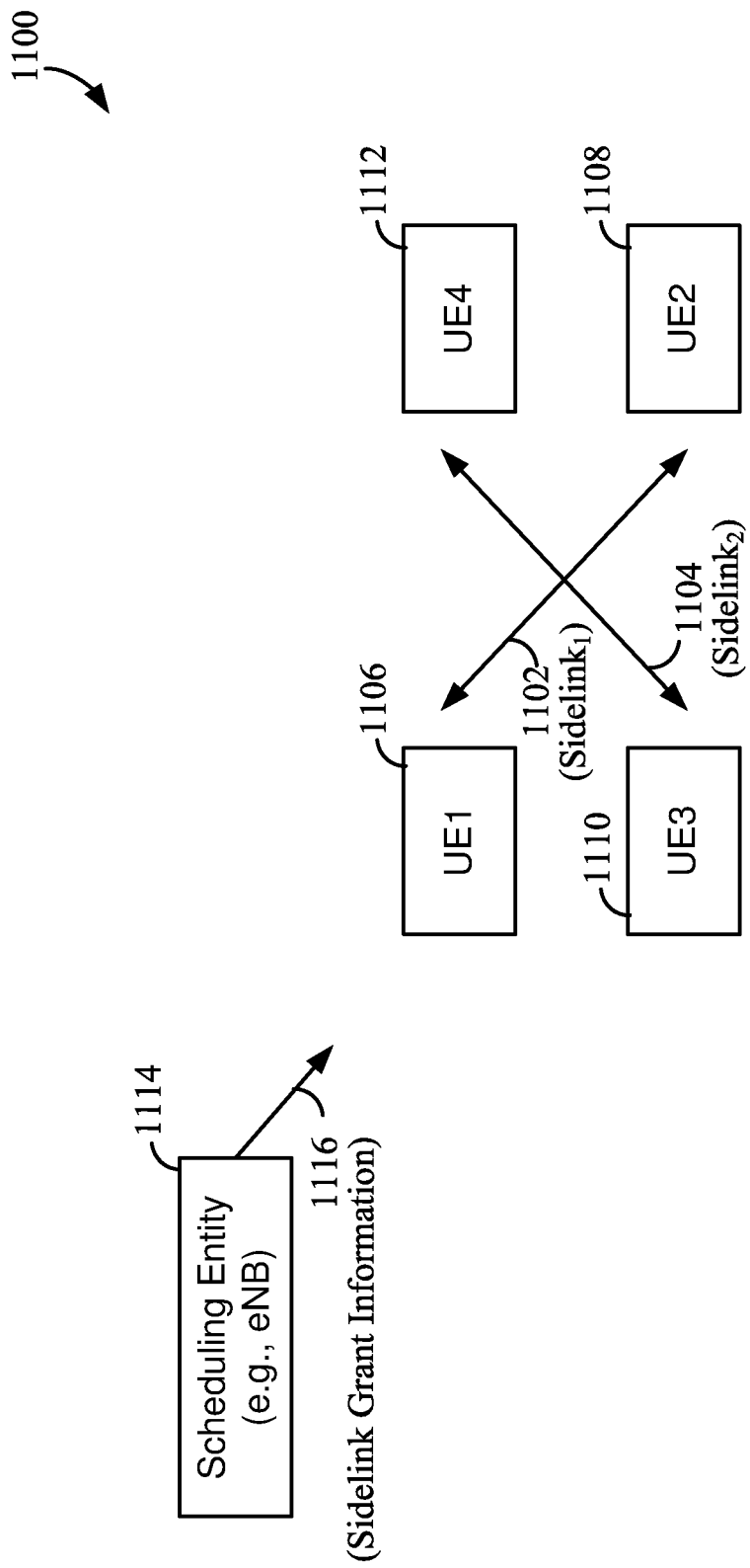
FIG. 11 is a block diagram providing an exemplary illustration to facilitate understanding of receiver-yielding (also referred to as RX-yielding) and transmitter-yielding (also referred to as TX-yielding) according to some aspects of the present disclosure.

FIG. 11 is a block diagram 1100 providing an exemplary illustration to facilitate an understanding of receiver-yielding (also referred to as RX-yielding) and transmitter-yielding (also referred to as TX-yielding) according to some aspects of the present disclosure. In connection with the following explanation, assume that two sidelinks exist. Sidelink1 1102 is between UE1 1106 and UE2 1108. Sidelink2 1104 is between UE3 1110 and UE4 1112. Assume also that Sidelink1 1102 has a higher priority than Sidelink2 1104.

In the exemplary scenario of FIG. 11, a scheduling entity 1114 (e.g., an eNB, a base station) may transmit sidelink grant information 1116 via a control channel (e.g., control channel 802). The sidelink grant information 1116 may indicate that sidelink communication between scheduled neighboring devices (e.g., UE1 1106, UE2 1108, UE3 1110, UE4 1112) may be authorized for a predetermined period (e.g., a TTI, a frame, a sub-frame, a slot, or multiples thereof).

In an exemplary scenario of RX-yielding, if UE1 1106 and UE3 1110 concurrently transmit DSS signals in the DSS 804 channel, UE4 1112 will refrain from transmitting a DRS signal in a DRS 808 channel because Sidelink1 1102 has a relatively higher priority than Sidelink2 1104. Accordingly, the relatively lower priority sidelink, Sidelink2 1104, yields communication of the DRS signal in the DRS 808 channel from sidelink receiver UE4 1112 to sidelink receiver UE2 1108 under this RX-yielding scenario. In other words, sidelink receiver UE4 1112 yields the DRS 808 channel to sidelink receiver UE2 1108.

In an exemplary scenario of TX-yielding, if UE1 1106 and UE3 1110 concurrently transmit DSS signals in the DSS 804 channel, UE2 will transmit a DRS signal in the DRS 808 channel because Sidelink1 1102 has a relatively higher priority than Sidelink2 1104. In the DRS signal, UE2 may include, among other things, a reference signal (RS) that is configured to inform UE3 1110 that UE3 1110 will interfere with sidelink communication (e.g., interfere with transmission of data in the sidelink data channel 810) if UE3 1110 transmits sidelink data during the current predetermined period allocated for sidelink communication (e.g., the current TTI, frame, sub-frame, slot, or allocated multiples thereof). Accordingly, by receiving this RS, UE3 1110, which is a sidelink transmitter, will refrain from transmitting sidelink data during the current predetermined period allocated for sidelink communication. Accordingly, the relatively lower priority sidelink, Sidelink2 1104, yields communication of the sidelink data in sidelink data channel 810 from sidelink transmitter UE3 1110 to sidelink transmitter UE1 1106 under this TX-yielding scenario. In other words, sidelink transmitter UE3 1110 yields the sidelink data channel 810 to sidelink transmitter UE1 1106.

Sub-Band Scheduling

Each sidelink-centric subframe, such as the sidelink-centric subframes shown in FIGS. 7-10, 12, and 13, may include a number of consecutive subcarriers in the frequency domain. A set of contiguous subcarriers may be referred to herein as a sub-band. A set of sub-bands may span the entire bandwidth allocated to the sidelink. The number of sidelink subcarriers, and therefore, the number of sidelink sub-bands, may vary based on the sidelink grant. In some examples, the scheduling entity may provide a generic grant of frequency resources (e.g., bandwidth) that generally enables sidelink communications within a cell to occur over the granted sidelink bandwidth.

However, multiple sidelinks with varying traffic (e.g., varying amounts of data) may need to multiplex their sidelink signals within the same generic sidelink grant, e.g., utilizing frequency division multiplexing (FDM). For example, two sidelinks may each have traffic to transmit, but one of the sidelinks may require more bandwidth. To accommodate the different sidelinks and bandwidth requirements, the scheduling entity may provide link-specific grants of one or more sub-bands to each sidelink. However, the overhead of timely reporting channel state information (e.g., CQI) and buffer status reports (BSRs) from the scheduled entities (e.g., UEs) to the scheduling entity (e.g., eNB) for each sidelink may be excessive. As a result, it may not be efficient for a scheduling entity to provide per-TTI (or per-slot) sub-band scheduling for each sidelink.

Therefore, in accordance with aspects of the present disclosure, sub-band scheduling for each TTI, subframe, or slot may be coordinated between the scheduled entities. UEs engaging in sidelink communications may need to coordinate among themselves for sub-band scheduling. In some examples, each sidelink may be assigned a primary sub-band and one or more secondary sub-bands. Each sidelink may schedule sidelink signals on the corresponding primary sub-band and/or one or more secondary sub-bands based on sidelink priorities, traffic and/or channel interference. The primary and secondary sub-bands may be assigned by the scheduling entity or may be self-selected by the scheduled entities during discovery by observing sub-band utilization by other sidelinks. In general, determining, for a given sidelink, a primary sub-band and a plurality of secondary sub-bands from among a plurality of sub-bands designated for sidelink communication may be based on at least one of sidelink priorities, traffic (e.g., data) requirements, expected or historical link quality, neighborhood activity, or channel interference.

For example, a peer discovery mechanism may be used by an initiating device to discover the presence of other devices in a neighborhood or area (e.g., within a radial distance from the location of the initiating device). Once another device of interest is discovered, the initiating device may page the device of interest to associate with the other device and establish a sidelink between the two devices. As part of the association, a primary sub-band may be selected for sidelink communication therebetween. For example, one or both of the devices may observe sidelink traffic in the cell to identify the sub-bands currently in use by other sidelinks and select one of the sub-bands not currently in use as the primary sub-band. In some examples, the primary sub-band may be selected by the initiating device or primary device. In other examples, the primary sub-band may be negotiated between the devices.

Within this disclosure a sidelink request signal (e.g., DSS/STS) may be a request for channel access and a sidelink response signal (e.g., DRS) may be a response indicating whether the channel is available. Within this disclosure, a sidelink request signal may be exemplified by a DSS signal; however, the disclosure is not intended to be limited to DSS and/or DSS signaling. In other embodiments the sidelink request signal may be exemplified by an STS signal, or any other suitable signal. DSS is used herein for the sake of simplicity.

Figure 12:
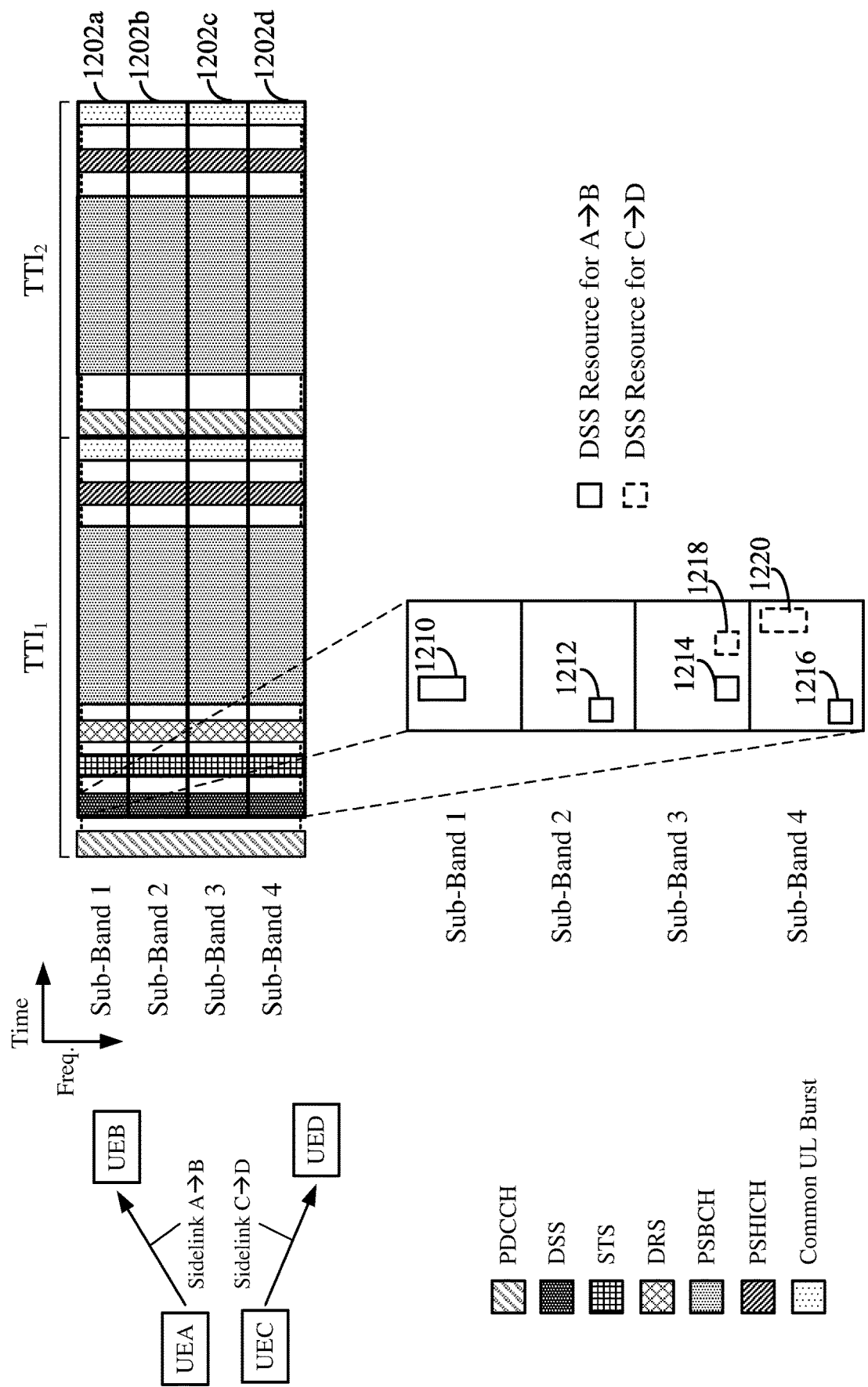
FIG. 12 is a diagram illustrating direction selection signal (DSS) signaling for sub-band access and interference management within sidelink-centric subframes according to some aspects of the present disclosure.

FIG. 12 is a diagram illustrating direction selection signal (DSS) signaling for sub-band access and interference management within sidelink-centric subframes according to some aspects of the present disclosure. FIG. 12 is illustrating an example where DSS is being transmitted as the sidelink request signal; however, this is only one example of transmission of a sidelink request signal and the discussion that follows may also apply to an example where STS is used as the sidelink request signal. Everything described herein with respect to the DSS channel applies equally well to the STS channel—DSS is exemplified herein for the sake of simplicity. Although the features described herein may be described in the context of DSS signaling, nothing herein is intended to limit the scope of the disclosure to such a context.

As indicated above, the available bandwidth allocated for sidelink communication may be partitioned, divided, or grouped into a number of sub-bands of equal or varying widths. For example, each sub-band may include the same or different numbers of subcarriers. The number of sub-bands and their respective widths may be indicated in the grant of sidelink frequency resources. In the example shown in FIG. 12, the available sidelink bandwidth is partitioned into four sub-bands 1202a-1202d of equal width. It should be understood that the number of sub-bands and/or the width of each sub-band may vary, depending on the particular implementation.

Each sidelink within a cell may be assigned a primary sub-band for sidelink communication. In some examples, each sidelink may receive an assignment of the primary sub-band from the scheduling entity. In other examples, the sidelink itself (e.g., one or both of the devices involved in the sidelink) may be used to select the primary sub-band based on sub-band utilization by other sidelinks (e.g., by observing sidelink data (i.e., sidelink traffic) within the cell). The primary sub-band assignment or selection may be set for the duration of the sidelink or may be modified over time based on loading conditions and/or interference in the cell. For example, the scheduling entity or sidelink devices may change the primary sub-band assigned to a sidelink if the signal quality on another sub-band is better (e.g., the interference experienced on the other sub-band is less). As another example, the scheduling entity may change the primary sub-band assigned to a sidelink if the interference experienced by another sidelink is excessive (e.g., greater than a threshold) and the primary sub-band provides reduced interference for the other sidelink. In some examples, changes to primary sub-bands may be made infrequently (e.g., no more than once per frame).

In the example shown in FIG. 12, two sidelinks (A→B and C→D) share the available bandwidth. Sidelink A→B (e.g., a sidelink between UEA and UEB) has been assigned sub-band 1202a (sub-band 1) as its primary sub-band and sidelink C→D (e.g., a sidelink between UEC and UED) has been assigned sub-band 1202d (sub-band 4) as its primary sub-band. Each sidelink may access its primary sub-band and a set of one or more secondary sub-bands for communicating a sidelink signal. In the example shown in FIG. 12, sidelink A→B may access sub-band 1202a as its primary sub-band and sub-bands 1202b, 1202c, and 1202d as secondary sub-bands. Similarly, sidelink C→D may access sub-band 1202d as its primary sub-band and sub-bands 1202a, 1202b, and 1202c as secondary sub-bands.

Scheduling of sub-bands for sidelink signals to be transmitted over one or more TTIs may be performed utilizing DSS/STS and DRS signaling. For example, if UEA has traffic to be transmitted to UEB over sidelink A→B, UEA may determine an amount of traffic to be transmitted and select the primary sub-band 1202a and one or more secondary sub-bands 1202b, 1202c, 1202d, if needed, to accommodate the amount of traffic. Using the example shown in FIG. 12, UEA may have a large amount of traffic (data) to transmit to UEB, and therefore, may select the primary sub-band 1202a and all of the secondary sub-bands 1202b, 1202c, and 1202d. On the other hand, UEC may have minimal traffic to transmit to UED, and therefore, may select only the primary sub-band 1202d, or in another example, may select the primary sub-band 1202d and secondary sub-band 1202c.

In addition, various other factors may also be considered by UEA and UEC in selecting secondary sub-bands for the sidelink transmission. For example, the expected/historical link quality of the sidelink and/or the measured interference on the sidelink may be utilized to select the desired number sub-bands for the sidelink transmission (e.g., based on the amount of traffic to be transmitted). For example, the expected or historical link quality may be determined from one or more prior sidelink interference measurements (e.g., an average of prior sidelink interference measurements). In some examples, the sidelink interference measurement may include a signal-to-noise plus interference ratio (SINR) measured for each secondary sub-band. In some examples, the secondary sub-bands with the highest SINR/link quality may be selected. In other examples, the secondary sub-bands with poor SINR/link quality (e.g., based on a threshold) may not be selected. For example, the SINR/link quality for each sub-band may be compared with a threshold, and if the SINR/link quality is less than the threshold, the sub-band may not be selected.

The SINR/link quality may further be utilized to determine the number of sub-bands selected. For example, the number of sub-bands selected may be fewer than that needed for the amount of traffic if the SINR/link quality is too poor on some of the sub-bands. For example, if four sub-bands are needed to transmit the sidelink signal, but only three of the sub-bands have an SINR greater than a threshold, only the three sub-bands with an SINR greater than the threshold may be selected.

Once the sub-bands have been selected for a particular sidelink signal, a DSS/STS signal may be transmitted indicating the selected sub-bands. In the example shown in FIG. 12, UEA and UEC may transmit respective DSS/STS signals to UEB and UED indicating the selected sub-bands. The respective DSS/STS signals may be orthogonal signals; accordingly, each receiver (UEB and UED) may decode the DSS/STS signal from its transmitter and the neighboring transmitter. For example, the DSS/STS signal transmitted by UEA may indicate a requested duration of time for UEA to utilize the primary sub-band and a set of one or more secondary sub-bands to transmit a sidelink signal associated with sidelink A→B (e.g., the link between UEA and UEB). The DSS/STS signal may be transmitted within the primary sub-band 1202a, within another sub-band, or across one or more sub-bands.

As depicted in FIG. 12, the DSS/STS signal transmitted by UEA may be distributed among a plurality of sub-bands (e.g., sub-bands 1-4, 1202a-1202d, respectively). The resources (e.g., time-frequency resources) assigned to each sub-band can be of different sizes for primary and secondary sub-bands. A sidelink may transmit most of the DSS/STS/DRS information (e.g., destination identification, transmission duration, RS, MCS, SINR) in the primary DSS/STS/DRS resource. By way of example, the primary sub-band for the DSS signal for sidelink A→B in FIG. 12 is assigned to be sub-band 1 1202a. The time-frequency resources 1210 assigned to the primary sub-band for the DSS signal, sub-band 1 1202a are illustrated as being larger than the time-frequency resources 1212, 1214, 1216 assigned to the secondary sub-bands for the DSS signal, sub-bands 2-4, 1202b-1202d, respectively.

The time-frequency resources 1212, 1214, 1216 in the secondary sub-bands for the DSS signal, may only be assigned a small number of tones (e.g., 1 or 2) in each secondary sub-band. In some aspects, the assigned resources may be sufficient for data signaling. In general, the small number of tones may be used for channel measurement and/or occupation indication (e.g., indication of an intent of a sidelink to occupy the secondary sub-band). According to aspects described herein, because each sidelink may have one primary sideband and a plurality of secondary sidebands, it is desirable to keep the per-sidelink secondary resources small in size. This may facilitate having a larger number of sidelinks and may facilitate load-balancing across the sub-bands.

It is noted that the distinction made in aspects presented herein is that the primary sub-band is used to carry most of the DSS/STS/DRS information and therefore, most of the DSS/STS/DRS resources are assigned to the primary sub-band. The secondary sub-bands are used for smaller amounts of information and therefore are assigned a smaller size of resources (in comparison to the primary sub-band). Because each sidelink may have one primary sub-band and a large number of secondary sub-bands, it is desired to keep the size of the per-sidelink resources assigned to each secondary sub-band small, so that a large number of sidelinks can be accommodated in a given bandwidth. There may be sizable overlap in sub-band use, for example when multiple sidelinks use the same sub-band as primary and secondary sub-band. Because the transmitter side and the receiver side know that a sub-band designated as primary carries most of the DSS/STS/DRS information, the resources assigned by a sidelink to the primary sub-band are greater than those assigned to secondary sub-bands.

For each primary and secondary resource, a sidelink may also have a priority order. This order can be different for different sub-bands. For example, the priority order in sub-bands could be indicated through location of tones (e.g., location of tones in time and/or frequency) within the resources allocated in the sub-band. For example, in sub-band 3, 1202c, the time-frequency resource 1214 for the DSS signal for sidelink A→B appears to the left of the time-frequency resource 1218 for the DSS signal for sidelink C→D. This positioning indicates that time-frequency resource 1214 for the DSS signal comes earlier in time than time-frequency resource 1218 for the DSS signal. According to one aspect, a first resource (e.g., time-frequency resource 1214) that appears earlier in time than a second resource (e.g., time-frequency resource 1218) may be designated as having a higher priority than the second resource. According to one aspect, a first resource (e.g., time-frequency resource 1220) that appears lower in frequency than a second resource (e.g., time-frequency resource 1216) may be designated as having a higher priority than the second resource. Of course, any determination of priority based on positioning in time and/or frequency may be subject to pre-defined rules. For example, nothing herein is meant to limit priority ordering in sub-bands to scenarios in which the earliest presented resource has the highest priority. Similarly, nothing herein is meant to limit priority ordering in sub-bands to scenarios in which the lowest frequency resource has the highest priority.

It is also important to note that according to exemplary aspects described herein, the priority of information related to a given sidelink in a given sub-band may be different from the priority of information related to the same sidelink in a different sub-band. In other words, priority of information for a given sidelink may change depending on the sub-band in which the information is carried. For example, one sidelink may have a higher priority for accessing information in a first secondary sub-band than it has for accessing information in a second secondary sub-band. An ability to change the priority of the resources of a sidelink on a per-sub-band basis may allow for greater load balancing across multiple sub-bands of a given bandwidth (e.g., a bandwidth partitioned into a plurality of sub-bands) than if priority was fixed for all information related to a sidelink across all of the sub-bands used by the sidelink.

Figure 13:
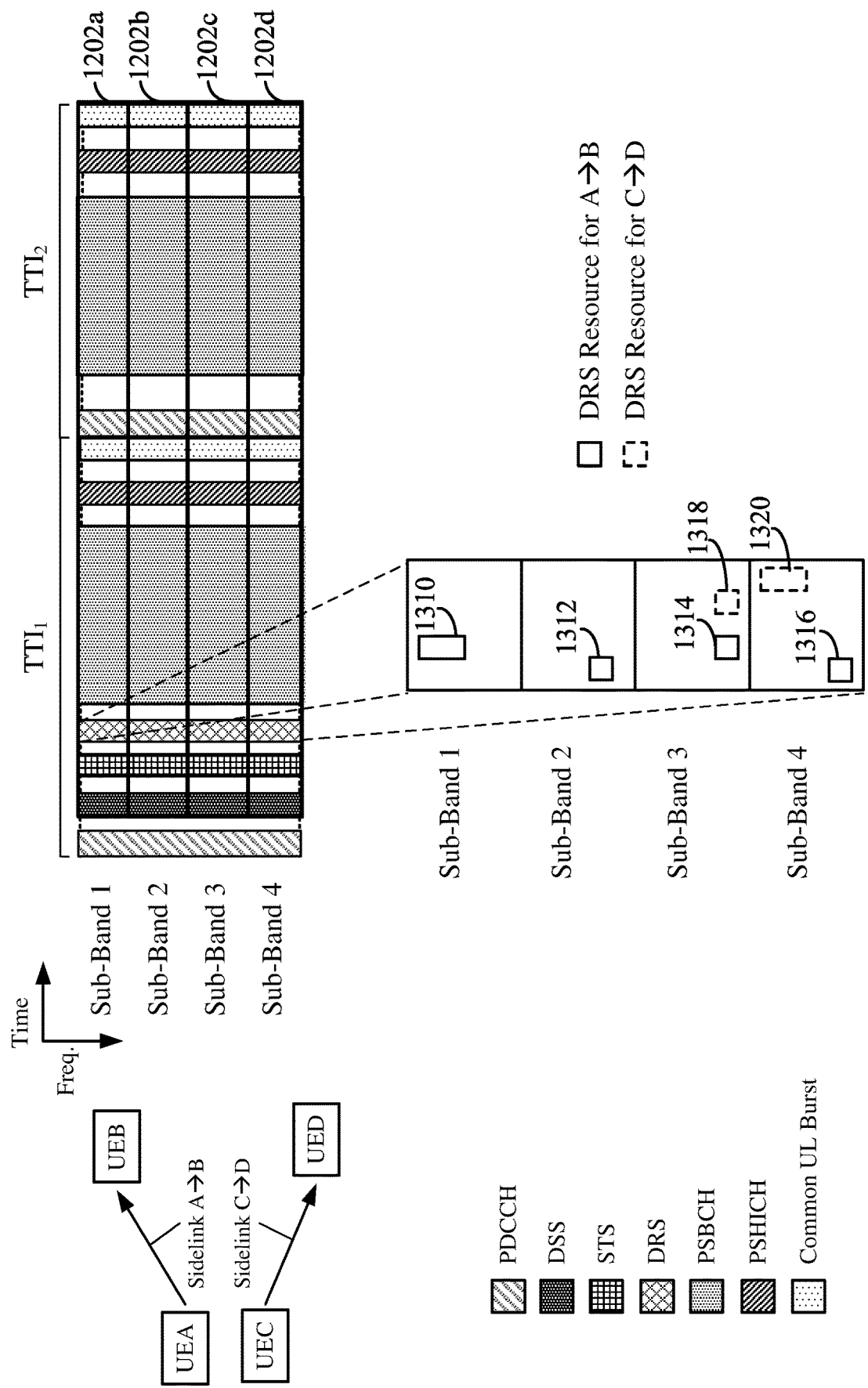
FIG. 13 is a diagram illustrating destination receive signal (DRS) signaling for sub-band access and interference management within sidelink-centric subframes according to some aspects of the present disclosure.

FIG. 13 is a diagram illustrating destination receive signal (DRS) signaling for sub-band access and interference management within sidelink-centric subframes according to some aspects of the present disclosure. As indicated above, the available bandwidth allocated for sidelink communication may be partitioned into a number of sub-bands of equal or varying widths. For example, each sub-band may include the same or different numbers of subcarriers. The number of sub-bands and their respective widths may be indicated in the grant of sidelink frequency resources. In the example shown in FIG. 13, the available sidelink bandwidth is partitioned into four sub-bands 1202a-1202d of equal width (corresponding to the same four sub-bands in FIG. 12). It should be understood that the number of sub-bands and/or the width of each sub-band may vary, depending on the particular implementation. By way of example, the primary sub-band for the DRS signal for sidelink A→B in FIG. 13 is assigned to be sub-band 1 1202a. The time-frequency resources 1310 assigned to the primary sub-band for the DRS signal, sub-band 1 1202a are illustrated as being larger than the time-frequency resources 1312, 1314, 1316 assigned to the secondary sub-bands for the DRS signal, sub-bands 2-4, 1202b-1202d, respectively. By way of example, the primary sub-band for the DRS signal for sidelink C→D in FIG. 13 is assigned to be sub-band 4 1202d. The time-frequency resources 1320 assigned to the primary sub-band for the DRS signal, sub-band 4 1202d are illustrated as being larger than the time-frequency resources 1318 assigned to the secondary sub-bands for the DRS signal, sub-bands 1-3, 1202a-1202c, respectively.

Upon receiving the respective DSS/STS signals, UEB and UED may each perform RX-yielding to any higher priority sidelinks, accept one or more of the selected sub-bands for the sidelink transmission, and transmit respective DRS signals to UEA and UEC indicating the accepted sub-band (s). For example, the accepted sub-band(s) may include the primary sub-band if the primary sub-band is not being utilized in the current sidelink-centric subframe as a primary sub-band of a higher priority sidelink. In addition, the accepted sub-band(s) may include a secondary sub-band if the secondary sub-band is not being utilized in the current sidelink-centric subframe as a primary sub-band of another sidelink and no other sidelink requesting to use the sub-band as a secondary sub-band has a higher priority. Thus, the accepted sub-band(s) may include the primary sub-band and/or one or more secondary sub-bands. In some aspects, if RX-yielding is required for all selected sub-bands (e.g., both primary and secondary), the receiving device (UEB or UED) may not accept any sub-bands, and therefore, may not transmit the DRS signal to the transmitting device (UEA or UEC). However, according to some aspects of DSS/STS/DRS signaling described herein, the sidelink receiver (e.g., UEB, UED) may transmit a DRS signal on a primary sub-band, even when the sidelink receiver is not accepting the primary sub-band (e.g., due to RX-yielding). In such a scenario, the sidelink receiver may transmit a DRS signal on the primary sub-band to convey CQI, MCS, RS with power backoff.

Using the above example, with reference to FIG. 13, because sub-band 1202d (sub-band 4) is assigned as the primary sub-band for sidelink C→D, UEB may yield sub-band 1202d (sub-band 4) to sidelink C→D and accept the primary sub-band 1202a (sub-band 1) and secondary sub-bands 1202b (sub-band 2) and 1202c (sub-band 3) for the sidelink transmission from UEA. Therefore, UED may accept sub-band 1202d (sub-band 4) for the sidelink transmission from UEC. UED may yield sub-band 1202c (sub-band 3) to sidelink A→B because DRS resource for A→B 1314 has a higher priority (based on the position of the resource in time) than DRS resource for C→D 1318.

In addition to priorities among the sidelinks, UEB and UED may further consider various other factors in identifying the accepted sub-bands. In some examples, UEB and UED may select the accepted sub-band(s) based on the expected sidelink interference. For example, UEB may measure the sidelink/channel interference, and if the measured interference will allow a higher MCS than is currently being utilized for the sidelink, UEB may determine that the traffic to be transmitted in the sidelink signal may fit within fewer sub-bands. Thus, UEB may accept only a subset of the secondary sub-bands selected by UEA. Continuing with the above example, if UEB determines that the traffic from UEA may be received within only sub-bands 1202a and 1202b, UEB may accept only sub-bands 1202a and 1202b, thus enabling other lower priority sidelinks to potentially utilize sub-band 1202c.

If one or more sub-bands are accepted for each sidelink, UEB and UED may each transmit respective DRS signals indicating availability of the accepted sub-band(s) for a requested duration of time. The DRS signal may be transmitted within the primary sub-band, within each accepted sub-band, or across one or more sub-bands. UEA and UEC may then transmit respective sidelink signals (e.g., signals including the traffic) over the respective accepted sub-bands.

Figure 14:
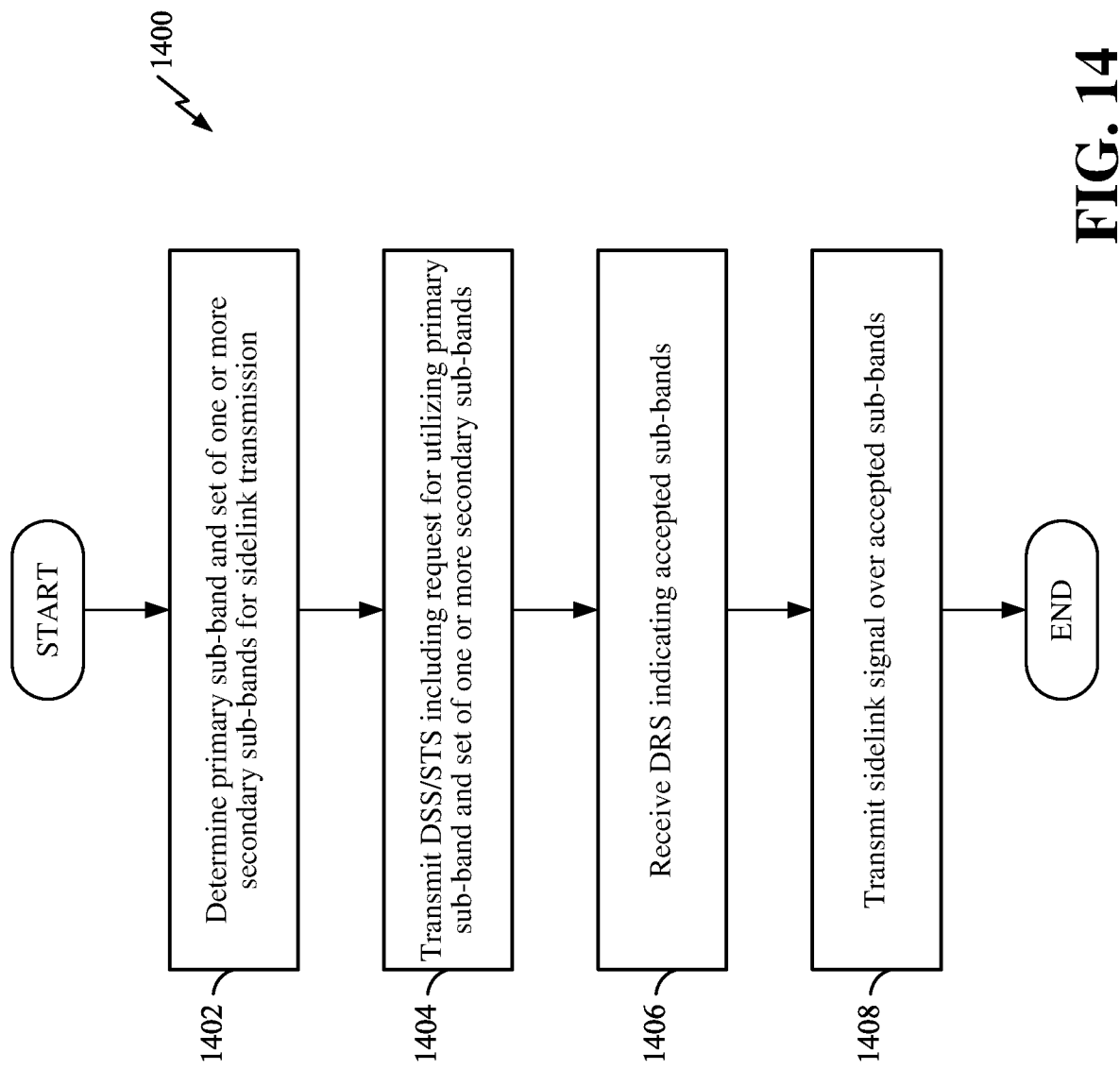
FIG. 14 is a flow chart illustrating a process for sidelink communication using sub-band scheduling according to some aspects of the present disclosure.

FIG. 14 is a flow chart illustrating a process 1400 for sidelink communication utilizing sub-band scheduling according to some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may the user equipment 126 and/or 128 illustrated in FIG. 1; and/or the scheduled entity 204 (e.g., 204a and/or 204b) illustrated in FIGS. 2 and 4. In some examples, the process 1400 may be carried out by any suitable apparatus or means for carrying out the functions or algorithm described below.

At block 1402, the transmitting device may determine a primary sub-band and a set of one or more secondary sub-bands for subsequent transmission of a sidelink signal. In some examples, the transmitting device may determine an amount of traffic to be transmitted and determine the primary sub-band and one or more secondary sub-bands, if needed, to accommodate the amount of traffic. The transmitting device may also consider the expected or historical link quality of the sidelink and/or measured sub-band interference (e.g., the measured SINR on each sub-band) when determining the sub-bands for the sidelink transmission. For example, the transmitting device may determine to not select the sub-bands with poor link quality or low SINR (e.g., based on a threshold) or may rank the sub-bands according to link quality or SINR and determine to select the sub-bands with the highest link quality or SINR.

At block 1404, the transmitting device may transmit a DSS/STS signal (e.g., a request signal) to the receiving device indicating a requested duration of time for the transmitting device to utilize the primary sub-band and the selected set of one or more secondary sub-bands for a subsequent transmission of a sidelink signal. At block 1406, the transmitting device may receive a DRS signal from the receiving device indicating the accepted sub-band(s) for the sidelink signal. For example, the accepted sub-band(s) may be selected from the primary sub-band and the set of one or more secondary sub-bands. At block 1408, the transmitting device may then transmit the sidelink signal over the accepted sub-band(s).

Figure 15:
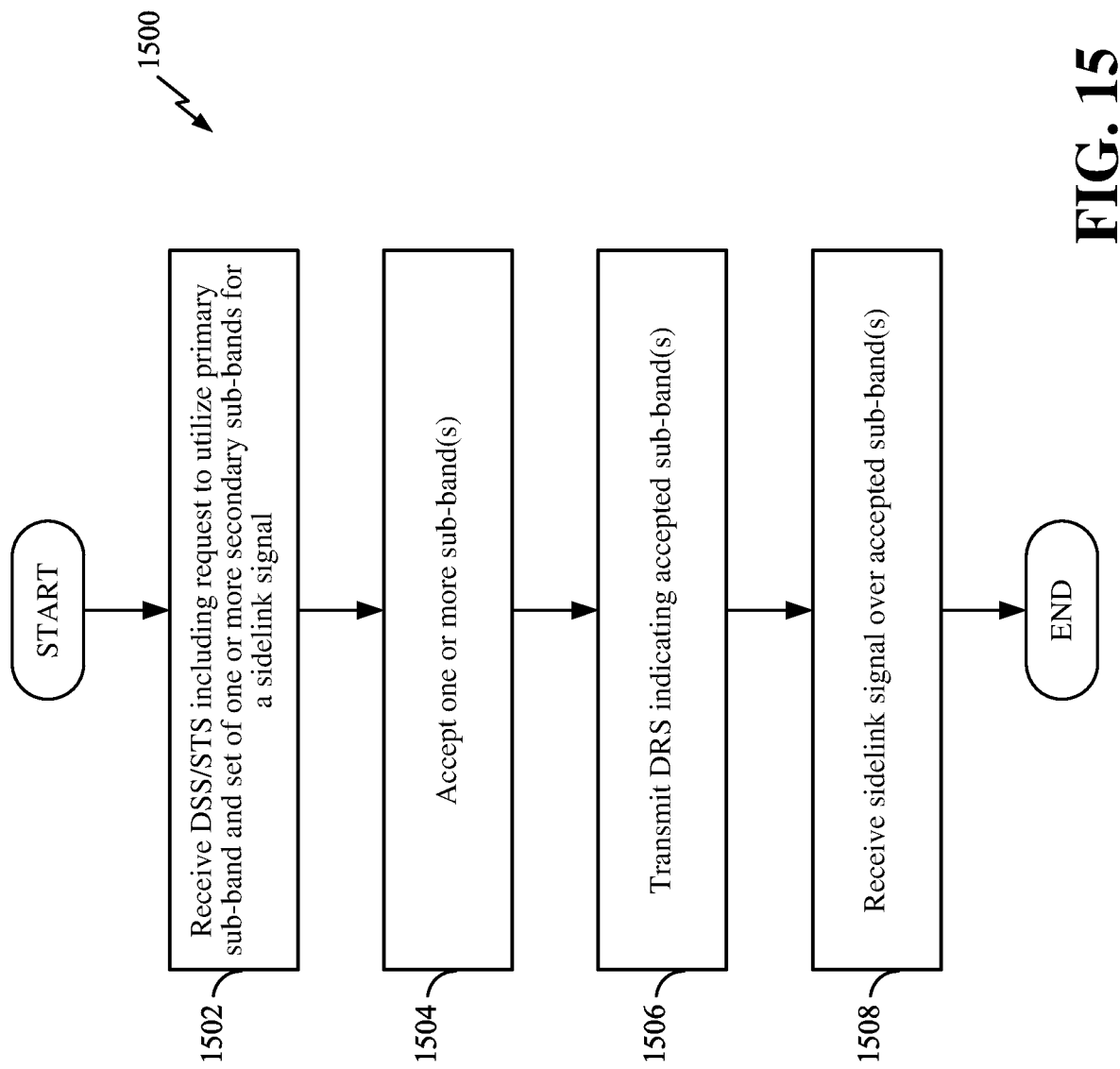
FIG. 15 is a flow chart illustrating a process for sidelink communication using sub-band scheduling according to some aspects of the present disclosure.

FIG. 15 is a flow chart illustrating a process 1500 for sidelink communication using sub-band scheduling according to some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may the user equipment 126 and/or 128 illustrated in FIG. 1; and/or the scheduled entity 204 (e.g., 204a and/or 204b) illustrated in FIGS. 2 and 4. In some examples, the process 1500 may be carried out by any suitable apparatus or means for carrying out the functions or algorithm described below.

At block 1502, the receiving device may receive a DSS/STS signal (e.g., a request signal) indicating a requested duration of time for the transmitting device to utilize a primary sub-band and a set of one or more secondary sub-bands for a subsequent transmission of a sidelink signal. The primary sub-band may be assigned to the sidelink between the transmitting and receiving devices. For example, the primary sub-band may be assigned by the scheduling entity or selected by the transmitting and/or receiving device. In some examples, the primary sub-band may be fixed. In other examples, the primary sub-band may vary over time.

At block 1504, the receiving device may accept one or more sub-bands for the sidelink signal. For example, the receiving device may accept the primary sub-band and/or one or more secondary sub-bands from the set of secondary sub-bands. In some examples, the sub-bands(s) may be accepted based on the relative priorities of the sidelinks within the cell, and based on whether other sidelinks have requested utilization of any of the sub-bands. In some examples, the sub-band(s) may further be accepted based on the usage of or interference on the sidelink.

At block 1506, the receiving device may transmit the DRS signal indicating the accepted sub-band(s) for the sidelink signal. At block 1508, the receiving device may then receive the sidelink signal over the accepted sub-band(s).

Figure 16:
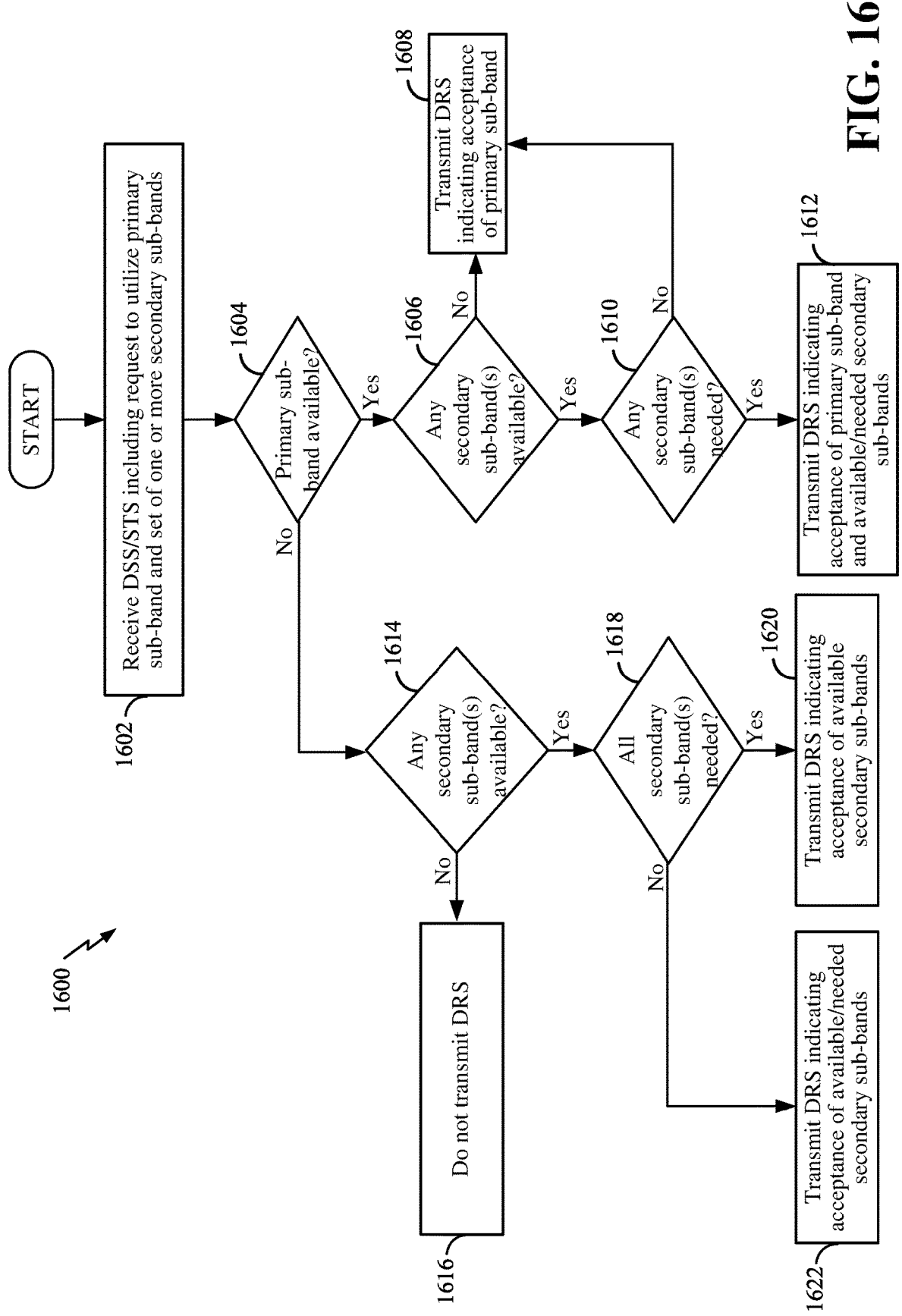
FIG. 16 is a flow chart illustrating a process for accepting sub-bands selected for a sidelink signal according to some aspects of the present disclosure.

FIG. 16 is a flow chart illustrating a process 1600 for accepting sub-bands selected for a sidelink signal according to some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may the user equipment 126 and/or 128 illustrated in FIG. 1; and/or the scheduled entity 204 (e.g., 204*a* and/or 204*b*) illustrated in FIGS. 2 and 4. In some examples, the process 1600 may be carried out by any suitable apparatus or means for carrying out the functions or algorithm described below.

At block 1602, the receiving device may receive a DSS/STS signal (e.g., a request signal) indicating a requested duration of time for the transmitting device to utilize a primary sub-band and a set of one or more secondary sub-bands for a subsequent transmission of a sidelink signal. At block 1604, the receiving device may determine whether the primary sub-band is available. For example, the receiving device may determine whether another sidelink with a higher priority and the same primary sub-band has requested to utilize the primary sub-band during the requested time. As discussed in greater detail above, if another higher priority sidelink with the same primary sub-band has requested to use the primary sub-band, the receiving device may yield the primary sub-band to the other sidelink.

If the primary sub-band is available (Yes branch of block 1604), at block 1606, the receiving device may determine whether any of the selected secondary sub-bands are available. For each secondary sub-band, the receiving device may determine whether another sidelink having the secondary sub-band as its primary sub-band has requested to utilize the secondary sub-band during the requested time. If another sidelink having the secondary sub-band as its primary sub-band has requested to utilize the secondary sub-band, the receiving device may yield the secondary sub-band to the other sidelink. In addition, for each secondary sub-band, the receiving device may determine whether another sidelink with a higher priority has requested to utilize the sub-band as a secondary sub-band during the requested time. If another sidelink with a higher priority has requested to utilize the secondary sub-band, the receiving device may yield the secondary sub-band to the other sidelink.

If the receiving device yields all secondary sub-bands to other sidelinks, the receiving device may determine that there are no secondary sub-bands available (No branch of 1606), and at block 1608, transmit the DRS signal to the transmitting device indicating acceptance of only the primary sub-band. However, if at least one secondary sub-band is available (Yes branch of block 1606), at block 1610, the receiving device may determine whether any of the secondary sub-bands are needed for the sidelink signal transmission. For example, the receiving device may measure the sidelink/channel interference, and if the measured interference enables a higher MCS to be utilized for the sidelink, the receiving device may determine that the traffic to be transmitted in the sidelink signal may fit within fewer sub-bands.

If the receiving device determines that the traffic may fit within only the primary sub-band, and therefore, no secondary sub-bands are needed for the sidelink signal transmission (No branch of block 1610), at block 1608, the receiving device may transmit the DRS signal to the transmitting device indicating acceptance of only the primary sub-band. However, if at least one secondary sub-band is needed for the sidelink signal transmission (Yes branch of block 1610), at block 1612, the receiving device may transmit the DRS signal to the transmitting device indicating acceptance of the primary sub-band and the available and needed secondary sub-bands. In some examples, the receiving device may accept all of the secondary sub-bands (e.g., if all secondary sub-bands are available and needed). In other examples, the receiving device may accept only a subset of the secondary sub-bands.

If the primary sub-band is not available (No branch of block 1604), at block 1614, the receiving device determines whether any of the secondary sub-bands are available, as discussed above. If no secondary sub-bands are available (No branch of block 1614), at block 1616, the receiving device does not transmit the DRS signal, as all sub-bands have been yielded to other sidelinks. However, if at least one secondary sub-band is available (Yes branch of block 1614), at block 1618, the receiving device determines whether all of the available sub-bands are needed for the sidelink signal transmission, as discussed above. If all of the available sub-bands are needed (Yes branch of block 1618), at block 1620, the receiving device may transmit the DRS signal to the transmitting device indicating acceptance of the available secondary sub-bands. In some examples, the receiving device may accept all of the secondary sub-bands (e.g., if all secondary sub-bands are available and needed). In other examples, the receiving device may accept only a subset of the secondary sub-bands. However, if all of the available sub-bands are not needed (No branch of block 1618), at block 1622, the receiving device may transmit the DRS signal to the transmitting device indicating acceptance of a subset of the secondary sub-bands that are both available and needed.

Figure 17:
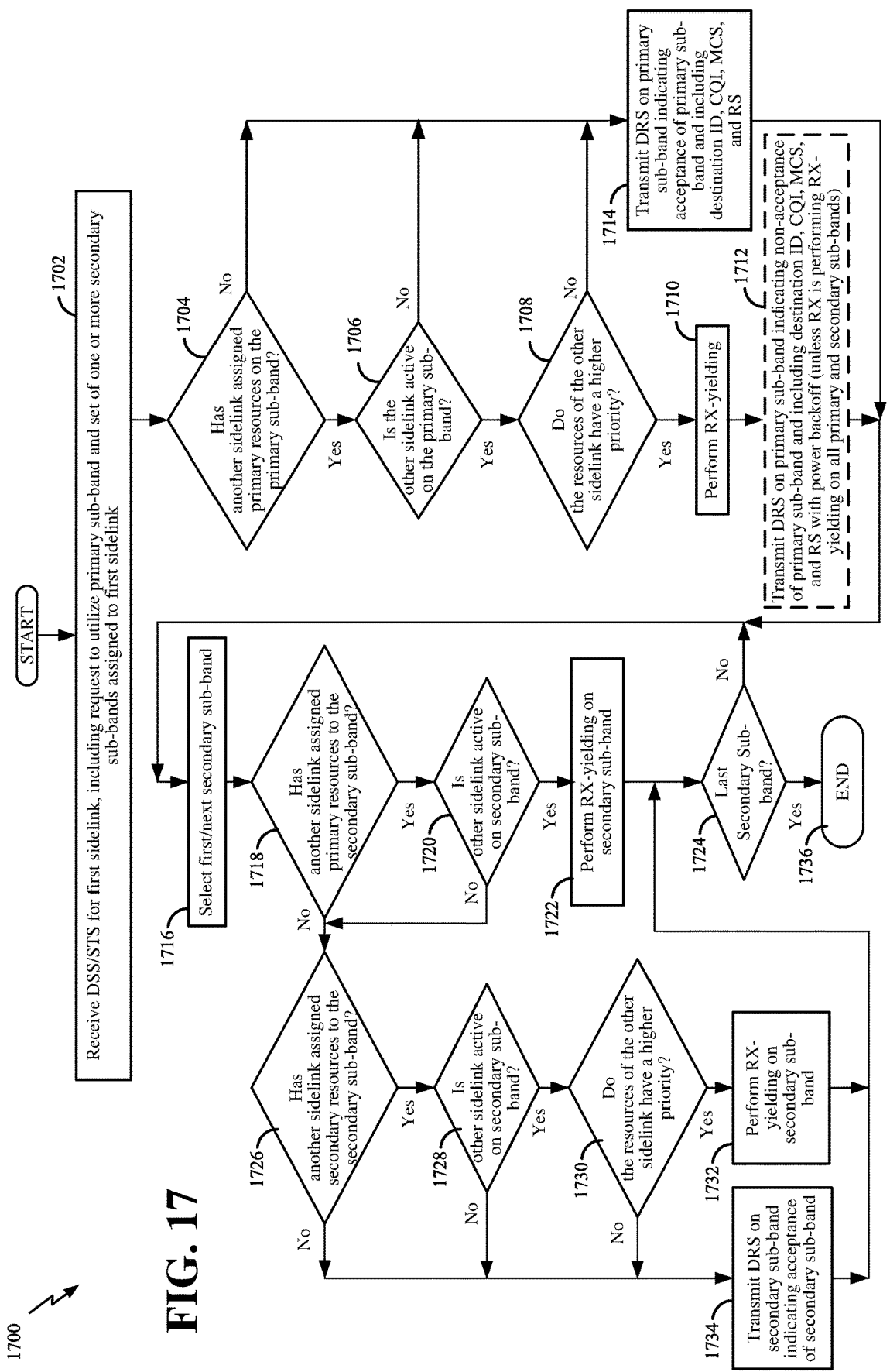
FIG. 17 is a flow chart illustrating a process for evaluating DSS signaling and transmitting DRS signaling responsive thereto according to some aspects of the present disclosure.

FIG. 17 is a flow chart illustrating a process 1700 for evaluating DSS/STS signaling (e.g., a request signal) and transmitting DRS signaling responsive thereto according to some aspects of the present disclosure. Some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be the user equipment 126 and/or 128 illustrated in FIG. 1; and/or the scheduled entity 204 (e.g., 204a and/or 204b) illustrated in FIGS. 2 and/or 4. In some examples, the process 1700 may be carried out by any suitable apparatus or means for carrying out the functions or algorithm described below.

At block 1702, a receiving device may receive a DSS/STS signal transmitted from a transmitting device in connection with a first sidelink, including a request to utilize a primary sub-band and a set of one or more secondary sub-bands assigned to the first sidelink. The receiving device may evaluate whether it will accept usage of the primary sub-band before, during, or after the device evaluates whether it will accept usage of the secondary sub-band(s).

At block 1704, the receiving device may determine whether another sidelink has assigned primary resources on the primary sub-band. If another sidelink has assigned primary resources on the primary sub-band (Yes branch of block 1704), at block 1706, the receiving device may determine whether the other sidelink (i.e., the "another sidelink") is active on the primary sub-band. If the other sidelink is active on the primary sub-band (Yes branch of block 1706), at block 1708 the receiving device may determine whether the resources of the other sidelink in the primary sub-band have a higher priority. If the resources of the other sidelink in the primary sub-band have a higher priority (Yes branch at block 1708) then the receiving device may perform RX-yielding at block 1710 in connection with the primary sub-band. However, in accordance with aspects described herein, the process may optionally pass to block 1712, where the receiving device may nevertheless transmit a DRS on primary sub-band to indicate non-acceptance of primary sub-band (i.e., that the primary sub-band will not accept a connection for the sidelink) as well as indicate acceptance/non-acceptance of the various secondary sub-bands; and also to indicate common information, such as, destination ID, a channel quality indicator (CQI), a modulation and coding scheme (MCS), and/or a reference signal (RS) with power backoff.

If the receiving device determines that another sidelink has not assigned primary resources on the primary sub-band (No branch of 1704), has assigned primary resources on the primary sub-band but is not active on the primary sub-band (No branch of 1706), or has assigned primary resources on the primary sub-band and although the other device is active on the primary sub-band, the resources of the other sidelink do not have a higher priority than those assigned for the first sidelink (No branch of 1708), then, at block 1714 the receiving device may transmit a DRS signal on the primary sub-band indicating acceptance of primary sub-band and including, for example, a destination ID, CQI, MCS, and RS. In summary, the feature of block 1714 may be reached if no higher priority primary resource is active in the primary sub-band.

The process with respect to the primary sub-band may proceed before, during, or after the process with respect to the one or more secondary sub-band(s); despite the process being shown as proceeding before the process with respect to the one or more secondary sub-band(s) in FIG. 17. The order of the processes shown in FIG. 17 is for explanatory purposes and is not intended to be limiting. At block 1716, the receiving device may select a first one of the one or more secondary sub-band(s) assigned to the first sidelink. As described below, after evaluation of the signaling associated with the selected first one of the one or more secondary sub-band(s), and if there are additional secondary sub-bands to be considered, the process may return to block 1716 where a next secondary sub-band may be selected for evaluation.

At block 1718, the receiving device may determine whether another sidelink has assigned primary resources on the selected secondary sub-band. If another sidelink has assigned primary resources on the secondary sub-band (Yes branch of block 1718), at block 1720, the receiving device may determine whether the other sidelink (i.e., the "another sidelink") is active on the secondary sub-band. If the other sidelink is active on the secondary sub-band (Yes branch of block 1720), at block 1722 the receiving device may perform RX-yielding at block 1722 in connection with the secondary sub-band. The process may advance to block 1724, where the receiving device may determine whether the selected secondary sub-band was the last secondary sub-band assigned to the first sidelink. If the selected secondary sub-band was not the last secondary sub-band assigned to the first sidelink (No branch of block 1724), the process may return to block 1716, where a next secondary sub-band may be selected. If another sidelink has not assigned a primary resource to the secondary sub-band (No branch of block 178) or if the other sidelink has assigned a primary resource to the secondary sub-band but the other sidelink is not active on the secondary sub-band (No branch of block 1720), then at block 1726 the receiving device may determine if another sidelink has assigned secondary resources to the secondary sub-band. If another sidelink has assigned secondary resources on the secondary sub-band (Yes branch of block 1726), at block 1728, the receiving device may determine whether the other sidelink is active on the secondary sub-band. If the other sidelink is active on the secondary sub-band (Yes branch of block 1728), at block 1730 the receiving device may determine whether the resources of the other sidelink in the secondary sub-band have a higher priority. If the resources of the other sidelink in the primary sub-band have a higher priority (Yes branch at block 1730) then the receiving device may perform RX-yielding on the secondary sub-band at block 1732.

If the receiving device determines that another sidelink has not assigned secondary resources on the secondary sub-band (No branch of 1726), has assigned secondary resources on the secondary sub-band but is not active on the secondary sub-band (No branch of 1728), or has assigned secondary resources on the secondary sub-band and although the other sidelink is active on the secondary sub-band, the resources of the other sidelink do not have a higher priority than those assigned for the first sidelink (No branch of 1730), then, at block 1734 the receiving device may transmit a DRS signal on the secondary sub-band indicating acceptance of secondary sub-band. In summary, the feature of block 1734 may be reached, for any given secondary sub-band if no primary resource of another sidelink, different from the first sidelink, is active in the secondary sub-band, and the DRS resource of the first sidelink in the secondary sub-band has a higher priority than DRS resources of other sidelinks, different from the first sidelink, in the secondary sub-band (e.g., other resources in the secondary sub-band).

From either of block 1732 or 1734, the process may advance to block 1724, where the receiving device may determine whether the selected secondary sub-band was the last secondary sub-band assigned to the first sidelink. If the selected secondary sub-band was not the last secondary sub-band assigned to the first sidelink (No branch of block 1724), the process may return to block 1716, where a next secondary sub-band may be selected. If the selected secondary sub-band was the last secondary sub-band assigned to the first sidelink (Yes branch of block 1724), the process may end at block 1736.

Figure 18:
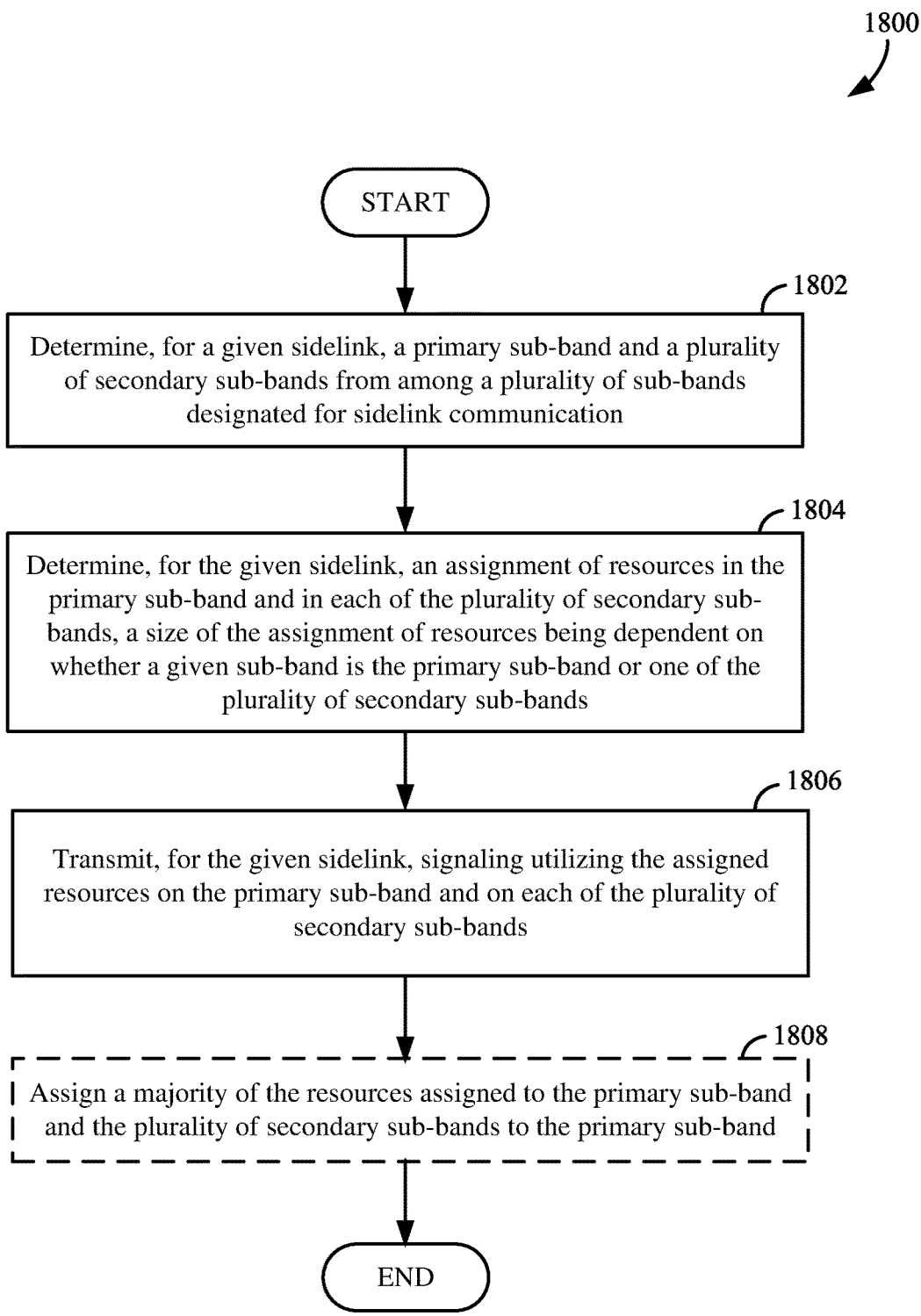
FIG. 18 is a flow chart illustrating a process for sidelink communication utilizing sub-band scheduling according to some aspects of the present disclosure.

FIG. 18 is a flow chart illustrating a process 1800 for sidelink communication utilizing sub-band scheduling according to some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may the user equipment 126 and/or 128 illustrated in FIG. 1; and/or the scheduled entity 204 (e.g., 204*a* and/or 204*b*) illustrated in FIGS. 2 and 4. In some examples, the process 1800 may be carried out by any suitable apparatus or means for carrying out the functions or algorithm described below. In some configurations, such methods and/or processes may be operational, performed, and/or implemented in a scheduled entity 204 (e.g., a UE, a device, 204*a*, 204*b*), where the scheduled entity 204 may be a sidelink transmitter or a sidelink receiver.

At block 1802, a device (e.g., a sidelink receiver, a sidelink transmitter, a processor (304, 404) thereof) may determine, for a given sidelink, a primary sub-band and a plurality of secondary sub-bands from among a plurality of sub-bands designated for sidelink communication. At block 1804, the device may determine, for the given sidelink, an assignment of resources in the primary sub-band and in each of the plurality of secondary sub-bands, a size of the assignment of resources being dependent on whether a given sub-band is the primary sub-band or one of the plurality of secondary sub-bands. In some aspects, more resources may be allocated to a primary sub-band in comparison to any given secondary sub-band. At least one benefit to allocating more resources to a primary sub-band in comparison to a secondary sub-band is that most of the STS/DRS information, such as destination identifier, transmission duration, reference signal (RS), etc. can be sent in a primary sub-band while signaling in the secondary sub-band(s) may only need to provide for channel measurement and/or occupation indication. Allocation of resources may be determined by either a base station (e.g., a scheduling entity) or local determination of available STS/DRS resources during discovery/association phases. At block 1806, the device may transmit, for the given sidelink, signaling utilizing the assigned resources on the primary sub-band and on each of the plurality of secondary sub-bands. In some aspects, the resources for the primary sub-band have a greater size than the resources for any one of the plurality of secondary sub-bands. According to some aspects, the signaling may comprise direction selection signal (DSS) signaling, source transmit signal (STS) signaling (where DSS signaling and STS signaling are examples of sidelink request signaling), or destination receive signal (DRS) signaling (where DRS is an example of sidelink response signaling). According to some aspects, the resources may be used for sub-band access or sub-band interference management. According to some aspects, the plurality of sub-bands may be partitioned from a bandwidth allocated to sidelink communication and may be partitioned in different sizes (e.g., various sizes).

Within this disclosure a sidelink request signal (e.g., DSS/STS) may be a request for channel access and a sidelink response signal (e.g., DRS) may be a response indicating whether the channel is available.

At block 1808, the method may optionally further include assigning a majority of the resources assigned to the primary sub-band and the plurality of secondary sub-bands to the primary sub-band. According to some aspects, the method may further include limiting information designated to be transported by resources assigned to the plurality of secondary sub-bands to information that is conveyed using tone signaling. In other aspects, the method may facilitate an apparatus to limit information designated to be transported by resources assigned to the plurality of secondary sub-bands to information that is conveyed using tone signaling. According to some aspects, the method may further include limiting information designated to be transported by resources assigned to the primary sub-bands to information that is conveyed using digital signaling. In other aspects, the method may facilitate an apparatus to limit information designated to be transported by resources assigned to the primary sub-bands to information that is conveyed using digital signaling. Digital signaling is different from tone signaling.

Tone signaling utilizes a single tone (frequency) to transmit information (e.g., the STS or DRS) over the sidelink, whereas digital signaling utilizes two or more tones (frequencies) to transmit information (e.g., the STS or DRS) over the sidelink. In some examples, tone signaling refers to analog signaling. As used herein, the term "analog signaling" or "analog signal" refers to analog modulation (e.g., amplitude modulation (AM), frequency modulation (FM), phase modulation (PM), double sideband AM, single sideband AM, etc.) of a carrier signal at a transmitting device to transmit information from the transmitting device to a receiving device over the sidelink. However, the term "tone signaling" is not limited to analog signals, and may include any suitable single-tone signal. In some examples, digital signaling refers to multiple-tone signaling. As used herein, the term "digital signaling" or "digital signal" refers to digital modulation (e.g., BPSK, QPSK, QAM, etc.) of a carrier signal at a transmitting device to transmit information from the transmitting device to a receiving device over the sidelink. However, the term "digital signal" is not limited to digital signals, and may include any suitable multiple-tone signal.

In some instances, tone (e.g., analog) signaling may not provide adequate reliable signaling. For example, the DRS may require digital signaling to adequately transmit the CQI. Therefore, various aspects of the disclosure may further provide for a combination of tone and digital signaling (e.g., mixed analog and digital signaling) in, for example, the STS and DRS portions of a sidelink slot.

Digital signaling may provide more robust information exchange, such as carried in the primary sub-band, whereas tone signaling, which is compact and thus efficient in terms of overhead, may suffice for secondary sub-band signaling.

According to some aspects, the method may further include limiting a size of the resources assigned to each of the plurality of secondary sub-bands to a size that facilitates channel measurement or occupation indication (e.g., a size suitable for tone signaling). According to some aspects, a maximum size of the resources assigned to each of the plurality of secondary sub-bands may be 3 tones. According to other aspects, a maximum size of the resources assigned to each of the plurality of secondary sub-bands may be 2 tones.

According to some aspects, when a plurality of sidelinks are assigned by a plurality of devices to share a given sub-band, the processes described according to some aspects herein may also include establishing priority of each of a plurality of sidelinks in a given sub-band by a position in at least one of time or frequency of a resource associated with each of the plurality of sidelinks. In some aspects, the plurality of sidelinks may be assigned by a plurality of devices to share the given sub-band. According to some aspects, an earlier position (in time and/or frequency) may establish a higher priority than a later position.

According to some aspects, when the resources may be used for sidelink request signaling (e.g., at least one of direction selection signal (DSS) signaling or source transmit signal (STS) signaling), the processes described herein may further include determining the assignment of resources in the primary sub-band and in each of the plurality of secondary sub-bands based on, for example, at least one of traffic requirements, expected or historical link quality, or neighborhood activity. Within this disclosure, traffic requirements may mean an amount of data which the device determines to transmit to another device. For example, in one embodiment, traffic requirements may mean that the device has a certain amount of data buffered and determines that it is required to transmit that data traffic to another device. The amount of data required to be transferred may be referred to as the traffic requirement. Other examples of traffic requirements are within the scope of the disclosure. Within this disclosure, expected or historical link quality may be a calculated or measured link quality, where link quality may be described in several ways, including SINR within a given sub-band as calculated or measured between two devices. Other measures of link quality are known in the art. Other examples of expected or historical link quality are within the scope of the disclosure. Within this disclosure, neighborhood activity may mean usage of sub-bands within a radial distance from the location of an initiating device. Other examples of neighborhood activity are within the scope of the disclosure. The processes may further include transmitting the sidelink request signaling (e.g., the DSS/STS signaling) to a second device configured as a sidelink receiver. In other words, for example, transmitting the signaling comprises transmitting the sidelink request signaling to a second device configured as a sidelink receiver. For example, a sidelink transmitter can transmit a DSS/STS signal (e.g., a request signal) on a primary sub-band and zero or more secondary sub-bands. The way a sidelink transmitter decides on which sub-bands to use to transmit the DSS/STS signal (for both the primary sub-band and the zero or more secondary sub-bands) may be based on at least one of: traffic requirements (e.g., data requirements), expected or historical link quality, or neighborhood activity. For example, UEA may have sizable traffic for UEB, so it transmits a DSS on its primary sub-band (e.g., sub-band 1, 1202*a* of FIG. 12) and each of its secondary sub-bands (sub-bands 2-4, 1202*b*, 1202*c*, 1202*d* of FIG. 12), while UEC may have nominal traffic for UED and therefor transmits its DSS only in its primary sub-band (sub-band 4, 1202*d* of FIG. 12). A device may assign a sub-band as a primary sub-band for a given sidelink based on knowledge that there will be fewer (if any) other sidelinks that have assigned (or designated) that particular sub-band as a primary sub-band. UEA may have determined to select sub-band 1, 1202*a* of FIG. 12 as a primary sub-band based, not only on traffic requirements but also, or alternatively, on expected or historical link quality (e.g., better SINR on sub-band 1 in comparison to other sub-bands) and/or on neighborhood activity (e.g., low neighborhood activity or low usage of sub-band 1 by neighboring devices). Accordingly, the methods described herein may be used for sub-band access and interference management within sidelink-centric subframes.

According to some aspects, when the signaling comprises destination receive signal (DRS) signaling, the processes described herein may further include receiving a direction selection signal (DSS) signal and/or a source transmit signal (STS) (where the DSS signal and the STS signal are each examples of request signals), for the given sidelink, from a transmitting device, the sidelink request signal (e.g., the DSS/STS signal) transmitted in the primary sub-band and one or more of the plurality of secondary sub-bands. In some aspects, the DSS/STS signal may be transmitted in the primary sub-band and zero or more secondary sub-bands. The process may still further include responding with the DRS signaling in the primary sub-band if no higher priority primary sub-band of another sidelink, different from the given sidelink, is active in the primary sub-band. The process may still further include responding with the DRS signaling in each of the one or more of the plurality of secondary sub-bands if: no primary sub-band of another sidelink, different from the given sidelink, is active in the secondary sub-band, and the assigned resources of the given sidelink in the secondary sub-band have a higher priority than DRS resources of another sidelink, different from the given sidelink, in the secondary sub-band (e.g., other resources in the secondary sub-band). Accordingly, a sidelink receiver may accept on the primary and one or more secondary sub-bands, accept on only the primary sub-band, or accept on only one or more of the secondary sub-bands. It is noted that the sidelink receiver can transmit DRS on the primary sub-band even though it is not accepting connection on the primary sub-band. The primary sub-band carries most of the information in connection with DSS/STS and DRS. Therefore, even if connection is not accepted on the primary sub-band, DRS may still be transmitted on the primary sub-band to convey information related to which sub-band(s) will accept connection and to convey common information such as source identification, duration of transmission, SINR of the DSS/STS reference signal (RS), MCS selection, and the DRS RS. The DRS on the primary sub-band may indicate which of the primary and secondary sub-bands are accepting connection (even if connection is not being accepted on the primary sub-band), at least because the secondary resources may not be able to carry the connection information and the common information due to their small size.

In one configuration, the exemplary process of FIG. 18 (or any of FIGS. 14-18, or any processes described herein) may be implemented in an apparatus for wireless communications (e.g., 204, FIGS. 2 and 4). In other words, the method of wireless communication may be operational at a device (apparatus). In one configuration, the apparatus may include means for determining, for a given sidelink, a primary sub-band and a plurality of secondary sub-bands from among a plurality of sub-bands designated for sidelink communication. The apparatus may further include means for determining, for the given sidelink, an assignment of resources in the primary sub-band and in each of the plurality of secondary sub-bands, a size of the resources assigned to a given sub-band in the plurality of sub-bands being dependent on whether the given sub-band is the primary sub-band or one of the plurality of secondary sub-bands. The apparatus may further include means for transmitting, for the given sidelink, signaling utilizing the assigned resources on the primary sub-band and on each of the plurality of secondary sub-bands. In some aspects, the signaling for the primary sub-band requires a greater size of resources than the signaling for any one of the plurality of secondary sub-bands. The apparatus may further include means for assigning a majority of the resources assigned to the primary sub-band and the plurality of secondary sub-bands to the primary sub-band. The apparatus may further include means for limiting information designated to be transported by resources assigned to the primary sub-band to information that is conveyed using digital signaling, and means for limiting information designated to be transported by resources assigned to the plurality of secondary sub-bands to information that is conveyed using tone signaling that is different from digital signaling. The apparatus may further include means for establishing priority of each of a plurality of sidelinks in a given sub-band by a position in at least one of time or frequency of a resource associated with each of the plurality of sidelinks. In some aspects, the plurality of sidelinks may be assigned by a plurality of devices to share the given sub-band. The apparatus may further include, where the signaling comprises sidelink request signaling (e.g., at least one of direction selection signal (DSS) signaling or source transmit signal (STS) signaling), means for determining the assignment of resources in the primary sub-band and in each of the plurality of secondary sub-bands that may be based on at least one of: traffic requirements, expected or historical link quality, or neighborhood activity, and means for transmitting the signaling comprises means for transmitting the sidelink request signaling (e.g., the DSS/STS signaling) to a second device configured as a sidelink receiver. The apparatus may further include (where the resources are used for destination receive signal (DRS) signaling) means for receiving a sidelink request signal (e.g., a direction selection signal (DSS) signal and/or a source transmit signal (STS) signal, where the DSS signal and the STS signal are each an examples of a sidelink request signal), for the given sidelink, from a transmitting device, the DSS/STS signal transmitted in the primary sub-band and one or more of the plurality of secondary sub-bands, means for responding with the DRS signaling in the primary sub-band if no higher priority primary sub-band of another sidelink, different from the given sidelink, is active in the primary sub-band, and means for responding with the DRS signaling in each of the one or more of the plurality of secondary sub-bands if: no primary sub-band of another sidelink, different from the given sidelink, is active in the secondary sub-band, and the assigned resources of the given sidelink in the secondary sub-band have a higher priority than DRS resources of another sidelink, different from the given sidelink, in the secondary sub-band. In one aspect the aforementioned means may be the processor (e.g., 304, 404) configured to perform the functions recited by the aforementioned means. In another aspect, the aforementioned means may be any circuit or any apparatus configured to perform the functions recited by the aforementioned means.

Of course, in the above examples, the circuitry included in the processor (e.g., 304, 404) is merely provided as an example for carrying out the described functions, and other means for carrying out the described functions may be included within various aspects of the present disclosure, including but not limited to the instructions stored in the computer-readable medium 406, (e.g., a non-transitory computer-readable medium storing processor-executable code) or any other suitable apparatus or means described in any one of the FIGS. 1-4, 7, 8, and 11 and utilizing, for example, the processes and/or algorithms described herein and/or described herein in relation to FIGS. 14-18.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Although the examples described herein (e.g., with reference to FIGS. 1-18) may describe certain features, operations, processes, methods, and/or aspects from the perspective of a scheduled entity 204 (e.g., UE, 204*a*, 204*b*), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure. Several aspects of a wireless communication network have been presented with reference to an exemplary implementation. As those skilled in the art will readily appreciate, various aspects described throughout this disclosure may be extended to other telecommunication systems, network architectures, and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" may be used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Within the present disclosure, the symbol "/" may be used to mean "or". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operational at a device, comprising:
   determining, for a given sidelink, a primary sub-band and a plurality of secondary sub-bands from among a plurality of sub-bands designated for sidelink communication;
   assigning, for the given sidelink, assigned resources within a given time duration allocated to only one given type of signal in the primary sub-band and each of the plurality of secondary sub-bands, a size of the assigned resources being dependent on whether a given sub-band is the primary sub-band or one of the plurality of secondary sub-bands;
   receiving a sidelink request signal for the given sidelink, from a transmitting device, the sidelink request signal transmitted in the primary sub-band and one or more of the plurality of secondary sub-bands; and
   transmitting, for the given sidelink, signaling of the only one given type of signal utilizing the assigned resources in the primary sub-band and in each of the plurality of secondary sub-bands, wherein the signaling comprises destination receive signal (DRS) signaling, and wherein the transmitting the signaling further comprises:
      responding with the DRS signaling in the primary sub-band if no higher priority primary sub-band of another sidelink, different from the given sidelink, is active in the primary sub-band, else perform receiver-yielding (RX-yielding) in the primary sub-band; and
      responding with the DRS signaling in each of the one or more of the plurality of secondary sub-bands if:
         no primary sub-band of another sidelink, different from the given sidelink, is active in the secondary sub-band, and
         the assigned resources of the given sidelink in the secondary sub-band have a higher priority than DRS resources of another sidelink, different from the given sidelink, in the secondary sub-band,
      else perform RX-yielding in the secondary sub-band.

2. The method of claim 1, wherein the assigned resources in the primary sub-band have a greater size than the assigned resources for any one of the plurality of secondary sub-bands.

3. The method of claim 1, further comprising:
   assigning a majority of the assigned resources to the primary sub-band.

4. The method of claim 1, further comprising:
   limiting information designated to be transported by resources assigned to the primary sub-band to information that is conveyed using digital signaling; and
   limiting information designated to be transported by resources assigned to the plurality of secondary sub-bands to information that is conveyed using tone signaling that is different from digital signaling.

5. The method of claim 1, further comprising:
   establishing priority of each of a plurality of sidelinks in a given sub-band by a position in at least one of time or frequency of a resource associated with each of the plurality of sidelinks,
   wherein the plurality of sidelinks are assigned by a plurality of devices to share the given sub-band.

6. The method of claim 1, wherein
   assignment of the assigned resources in the primary sub-band and each of the plurality of secondary sub-bands is based on at least one of:
      traffic requirements,
      expected or historical link quality, or
      neighborhood activity.

7. The method of claim 1, wherein the sidelink request signal comprises at least one of a direction selection signal (DSS) or a source transmit signal (STS).

8. An apparatus for wireless communication, comprising:
   a processor;
   a transceiver communicatively coupled to the processor; and
   a memory communicatively coupled to the processor,
   wherein the processor is configured to:
      determine, for a given sidelink, a primary sub-band and a plurality of secondary sub-bands from among a plurality of sub-bands designated for sidelink communication;
      assign, for the given sidelink, assigned resources within a given time duration allocated to only one given type of signal in the primary sub-band and each of the plurality of secondary sub-bands, a size of the assigned resources being dependent on whether a given sub-band is the primary sub-band or one of the plurality of secondary sub-bands;
      receive a sidelink request signal for the given sidelink, from a transmitting device, the sidelink request signal transmitted in the primary sub-band and one or more of the plurality of secondary sub-bands;

transmit, for the given sidelink, signaling of the only one given type of signal utilizing the assigned resources in the primary sub-band and in each of the plurality of secondary sub-bands, wherein the signaling comprises destination receive signal (DRS) signaling, and wherein the transmitting the signaling further comprises:

responding with the DRS signaling in the primary sub-band if no higher priority primary sub-band of another sidelink, different from the given sidelink, is active in the primary sub-band, else perform receiver-yielding (RX-yielding) in the primary sub-band; and responding with the DRS signaling in each of the one or more of the plurality of secondary sub-bands if:
no primary sub-band of another sidelink, different from the given sidelink, is active in the secondary sub-band, and
the assigned resources of the given sidelink in the secondary sub-band have a higher priority than DRS resources of another sidelink, different from the given sidelink, in the secondary sub-band,
else perform RX-yielding in the secondary sub-band.

9. The apparatus of claim 8, wherein the assigned resources in the primary sub-band have a greater size than the assigned resources for any one of the plurality of secondary sub-bands.

10. The apparatus of claim 8, wherein the processor is further configured to:
assign a majority of the assigned resources to the primary sub-band.

11. The apparatus of claim 8, wherein the processor is further configured to:
limit information designated to be transported by resources assigned to the primary sub-band to information that is conveyed using digital signaling; and
limit information designated to be transported by resources assigned to the plurality of secondary sub-bands to information that is conveyed using tone signaling that is different from digital signaling.

12. The apparatus of claim 8, wherein the processor is further configured to:
establish priority of each of a plurality of sidelinks in a given sub-band by a position in at least one of time or frequency of a resource associated with each of the plurality of sidelinks,
wherein the plurality of sidelinks are assigned by a plurality of devices to share the given sub-band.

13. The apparatus of claim 8, wherein
the assignment of the assigned resources in the primary sub-band and each of the plurality of secondary sub-bands is based on at least one of:
traffic requirements,
expected or historical link quality, or
neighborhood activity.

14. The apparatus of claim 8, wherein the sidelink request signal comprises at least one of a direction selection signal (DSS) or a source transmit signal (STS).

15. An apparatus for wireless communication, comprising:
means for determining, for a given sidelink, a primary sub-band and a plurality of secondary sub-bands from among a plurality of sub-bands designated for sidelink communication;

means for assigning, for the given sidelink, assigned resources within a given time duration allocated to only one given type of signal in the primary sub-band and each of the plurality of secondary sub-bands, a size of the assigned resources being dependent on whether a given sub-band is the primary sub-band or one of the plurality of secondary sub-bands;

means for receiving a sidelink request signal for the given sidelink, from a transmitting device, the sidelink request signal transmitted in the primary sub-band and one or more of the plurality of secondary sub-bands; and means for transmitting, for the given sidelink, signaling of the only one given type of signal utilizing the assigned resources in the primary sub-band and in each of the plurality of secondary sub-bands, wherein the signaling comprises destination receive signal (DRS) signaling, and wherein the means for transmitting further comprises:

means for responding with the DRS signaling in the primary sub-band if no higher priority primary sub-band of another sidelink, different from the given sidelink, is active in the primary sub-band, else performing receiver-yielding (RX-yielding) in the primary sub-band; and means for responding with the DRS signaling in each of the one or more of the plurality of secondary sub-bands if:
no primary sub-band of another sidelink, different from the given sidelink, is active in the secondary sub-band, and
the assigned resources of the given sidelink in the secondary sub-band have a higher priority than DRS resources of another sidelink, different from the given sidelink, in the secondary sub-band,
else performing RX-yielding in the secondary sub-band.

16. The apparatus of claim 15, wherein the assigned resources in the primary sub-band have a greater size than the assigned resources for any one of the plurality of secondary sub-bands.

17. The apparatus of claim 15, further comprising:
means for assigning a majority of the assigned resources to the primary sub-band.

18. The apparatus of claim 15, further comprising:
means for limiting information designated to be transported by resources assigned to the primary sub-band to information that is conveyed using digital signaling; and
means for limiting information designated to be transported by resources assigned to the plurality of secondary sub-bands to information that is conveyed using tone signaling that is different from digital signaling.

19. The apparatus of claim 15, further comprising:
means for establishing priority of each of a plurality of sidelinks in a given sub-band by a position in at least one of time or frequency of a resource associated with each of the plurality of sidelinks,
wherein the plurality of sidelinks are assigned by a plurality of devices to share the given sub-band.

20. The apparatus of claim 15, wherein
the assignment of the assigned resources in the primary sub-band and each of the plurality of secondary sub-bands based on at least one of:
traffic requirements,
expected or historical link quality, or
neighborhood activity.

21. The apparatus of claim 16, wherein the sidelink request signal comprises at least one of a direction selection signal (DSS) or a source transmit signal (STS).

22. A non-transitory computer-readable medium storing processor- executable code, comprising code for causing a processor to:
   determine, for a given sidelink, a primary sub-band and a plurality of secondary sub- bands from among a plurality of sub-bands designated for sidelink communication;
   assign, for the given sidelink, assigned resources within a given time duration allocated to only one given type of signal in the primary sub-band and each of the plurality of secondary sub-bands, a size of the assigned resources being dependent on whether a given sub-band is the primary sub-band or one of the plurality of secondary sub-bands; receive a sidelink request signal for the given sidelink, from a transmitting device, the sidelink request signal transmitted in the primary sub-band and one or more of the plurality of secondary sub-bands;
   transmit, for the given sidelink, signaling of the only one given type of signal utilizing the assigned resources in the primary sub-band and in each of the plurality of secondary sub-bands wherein the signaling comprises destination receive signal (DRS) signaling and wherein the code for causing the processor to transmit further comprises code for causing the processor to:
     respond with the DRS signaling in the primary sub-band if no higher priority primary sub-band of another sidelink, different from the given sidelink, is active in the primary sub-band, else perform receiver-yielding (RX yielding) in the primary sub-band; and
     respond with the DRS signaling in each of the one or more of the plurality of secondary sub-bands if:
       no primary sub-band of another sidelink, different from the given sidelink, is active in the secondary sub-band, and
       the assigned resources of the given sidelink in the secondary sub-band have a higher priority than DRS resources of another sidelink, different from the given sidelink, in the secondary sub-band,
     else perform receiver-yielding (RX yielding) in the secondary sub-band.

23. The non-transitory computer-readable medium storing processor-executable code of claim 22, wherein the assigned resources for the primary sub-band have a greater size than the assigned resources for any one of the plurality of secondary sub-bands.

24. The non-transitory computer-readable medium storing processor- executable code of claim 22, further comprising code for causing the processor to:
   assign a majority of the assigned resources to the primary sub-band.

25. The non-transitory computer-readable medium storing processor-executable code of claim 24, further comprising code for causing the processor to:
   limit information designated to be transported by resources assigned to the primary sub-band to information that is conveyed using digital signaling; and
   limit information designated to be transported by resources assigned to the plurality of secondary sub-bands to information that is conveyed using tone signaling that is different from digital signaling.

26. The non-transitory computer-readable medium storing processor-executable code of claim 22, further comprising code for causing the processor to:
   establish priority of each of a plurality of sidelinks in a given sub-band by a position in at least one of time or frequency of a resource associated with each of the plurality of sidelinks, wherein the plurality of sidelinks are assigned by a plurality of devices to share the given sub-band.

27. The non-transitory computer-readable medium storing processor-executable code of claim 22, wherein
   assignment of the assigned resources in the primary sub-band and each of the plurality of secondary sub-bands is based on at least one of:
   traffic requirements,
   expected or historical link quality, or
   neighborhood activity.

28. The non-transitory computer-readable medium storing processor-executable code of claim 22, wherein the sidelink request signal comprises at least one of a direction selection signal (DSS) or a source transmit signal (STS).

* * * * *